(12) United States Patent
Gautron

(10) Patent No.: US 12,353,879 B2
(45) Date of Patent: Jul. 8, 2025

(54) LOCK-FREE UNORDERED IN-PLACE COMPACTION

(71) Applicant: NVIDIA CORPORATION, Santa Clara, CA (US)

(72) Inventor: Pascal Gautron, Speracedes (FR)

(73) Assignee: NVIDIA CORPORATION, Santa Clara, CA (US)

( * ) Notice: Subject to any disclaimer, the term of this patent is extended or adjusted under 35 U.S.C. 154(b) by 110 days.

(21) Appl. No.: 18/468,642

(22) Filed: Sep. 15, 2023

(65) Prior Publication Data
US 2024/0111532 A1    Apr. 4, 2024

Related U.S. Application Data

(60) Provisional application No. 63/410,591, filed on Sep. 27, 2022.

(51) Int. Cl.
*G06F 3/06* (2006.01)
*G06F 9/30* (2018.01)
*G06F 11/10* (2006.01)

(52) U.S. Cl.
CPC ........ *G06F 9/30036* (2013.01); *G06F 9/3004* (2013.01)

(58) Field of Classification Search
None
See application file for complete search history.

(56) References Cited

U.S. PATENT DOCUMENTS

| | | | | |
|---|---|---|---|---|
| 5,649,029 A | * | 7/1997 | Galbi | H04N 19/423 704/E19.01 |
| 2013/0166876 A1 | * | 6/2013 | Arekapudi | G06F 12/00 712/E9.033 |
| 2015/0373155 A1 | * | 12/2015 | Singh | H04L 69/164 370/467 |
| 2021/0306004 A1 | * | 9/2021 | Koila | H03M 13/1157 |
| 2024/0111532 A1 | * | 4/2024 | Gautron | G06F 9/30036 |

OTHER PUBLICATIONS

Harris et al., "Chapter 39. Parallel Prefix Sum (Scan) with CUDA", https://developer.nvidia.com/gpugems/gpugems3/part-vi-gpu-computing/chapter-39-parallel-prefix-sum-scan-cuda, Sep. 14, 2023, 15 pages.

* cited by examiner

*Primary Examiner* — Hyun Nam
(74) *Attorney, Agent, or Firm* — Squire Patton Boggs LLP; Sarah Mirza

(57) ABSTRACT

Various embodiments include techniques for lock-free, unordered in-place compaction of an array. The techniques include receiving a first array that includes a first plurality of data entries, generating a second array that includes a second plurality of data entries, and storing, in the second array, respective index positions of valid data entries included in the first array and invalid data entries included in the first array. The techniques further include determining invalid data entries included in a first portion of the first array based at least on the index positions, determining valid data entries included in a second portion of the first array based at least on the index positions, and replacing contents of the invalid data entries included in the first portion of the first array with contents of the valid data entries included in the second portion of the first array.

20 Claims, 10 Drawing Sheets

LOCK-FREE UNORDERED IN-PLACE COMPACTION

CROSS-REFERENCE TO RELATED APPLICATIONS

This application claims benefit of the United States Provisional Patent Application titled "LOCK-FREE UNORDERED IN-PLACE COMPACTION," filed Sep. 27, 2022, and having Ser. No. 63/410,591. The subject matter of this related application is hereby incorporated herein by reference.

BACKGROUND

Field of the Various Embodiments

Various embodiments relate generally to data compaction and, more specifically, to parallel compaction of large sparse arrays.

Description of the Related Art

Various computing applications, including graphics processing and machine learning, process large sparse arrays of data. A sparse array is a data array that includes numerous redundant data elements, such as data elements that have values of zero. To improve computational efficiency when processing a sparse array, the sparse array can be compacted to eliminate redundant data elements included in the sparse array.

One approach to compacting a sparse array includes compacting the sparse array in-place using a sequential algorithm. With this approach, a destination index for each data element in the large sparse array is determined sequentially. After determining the destination index for each data element in the sparse array, each data element is serially written in the corresponding destination index of a second array. As such serial processing does not take advantage of a CPU's and/or GPU's parallel-processing capabilities, for instances in which a sparse array includes a large number of data entries and/or data entries having large sizes, in-place, sequential compaction is very time consuming.

Another approach to compacting a sparse array includes compacting the sparse array in parallel. When compared to the in-place, sequential compaction techniques, techniques for compacting sparse arrays in parallel reduce computation time. However, such conventional in-parallel compaction techniques are inefficient and/or consume large amounts of memory. For example, during parallel compaction of a sparse array, a buffer array of the same size as the sparse array is needed to store the result of the compaction, thereby nearly doubling the amount of memory usage in comparison to in-place, sequential compaction techniques. Furthermore, conventional in-parallel compaction algorithms focus on preserving the order of input data included in the sparse array thereby limiting the parallelization opportunities.

As the foregoing illustrates, what is needed in the art are more effective techniques for compacting sparse arrays.

SUMMARY

Various embodiments of the present disclosure set forth a computer-implemented method for parallel, lock-free, unordered in-place compaction of a sparse array. The method includes receiving a first array that includes a first plurality of data entries, generating a second array that includes a second plurality of data entries, and storing, in the second array, respective index positions of valid data entries included in the first array and invalid data entries included in the first array. The method further includes determining, based at least on the index positions stored in the second array, one or more invalid data entries included in a first portion of the first array, determining, based at least on the index positions stored in the second array, one or more valid data entries included in a second portion of the first array, and replacing contents of the one or more invalid data entries included in the first portion of the first array with contents of the one or more valid data entries included in the second portion of the first array.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that, with the disclosed techniques, a processor can perform one or more steps of a compaction process in parallel, thereby taking advantage of the processing capabilities of accelerator processing subsystems that include multiple parallel processing units. The disclosed techniques can thereby result in significant reduction of the processing time needed to compact an input array, such as a large sparse array. At least another technical advantage of the disclosed techniques relative to the prior art is that, with the disclosed techniques, an input array can be compacted without preserving the order of the data entries included in the input array. As a result, a buffer array that consumes much less space in memory than the array can be used to store the index positions of the data entries included in the input array during the compaction process. This decreased size of the buffer array relative to the input array significantly reduces the amount of memory that is needed for compacting the input array and/or storing the buffer array during compaction of the input array. These advantages represent one or more technological improvements over prior art approaches.

BRIEF DESCRIPTION OF THE DRAWINGS

So that the manner in which the features of the various embodiments recited herein can be understood in detail, a more particular description of the inventive concepts, briefly summarized herein, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
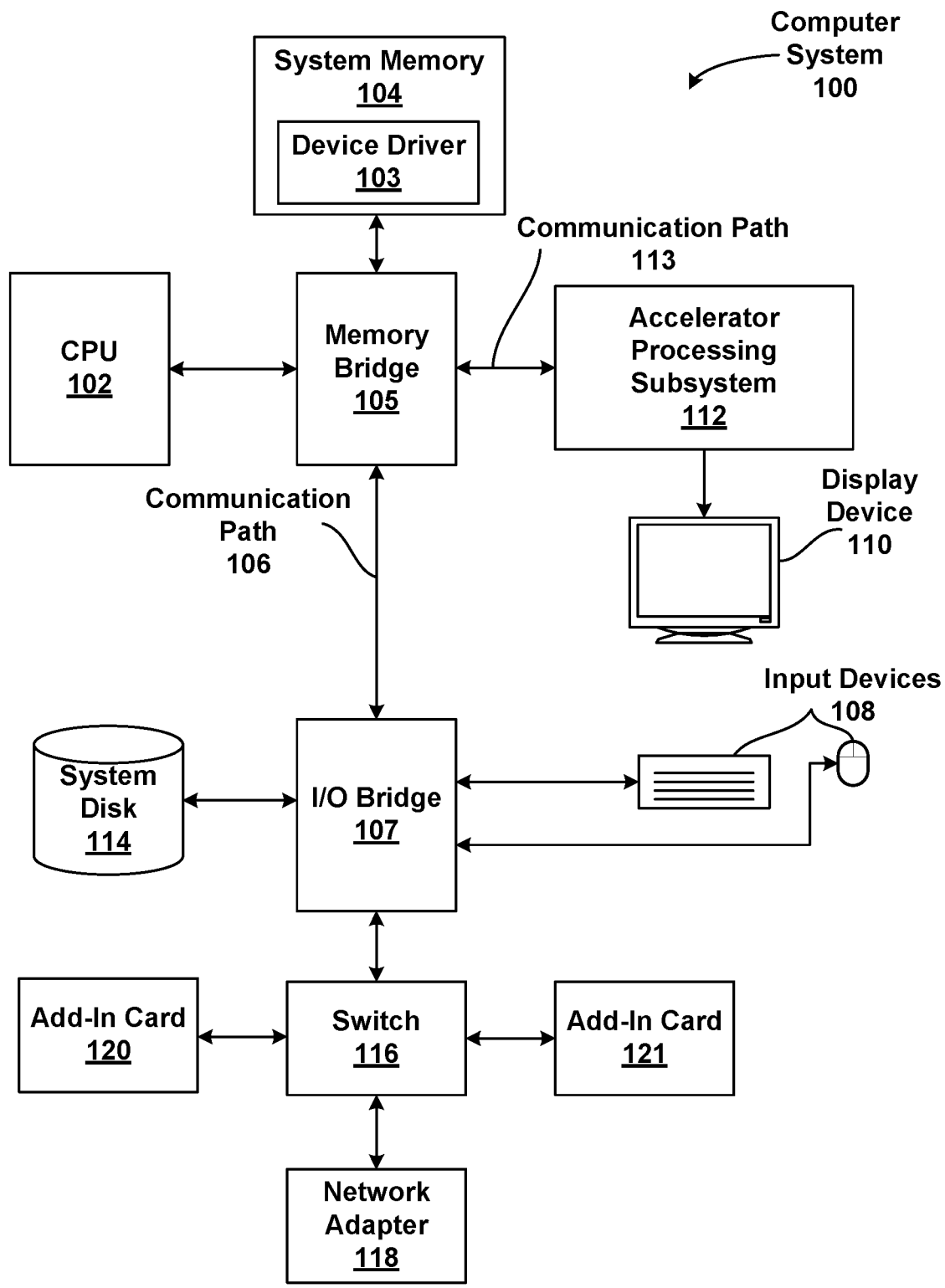
FIG. 1 is a block diagram of a computing system configured to implement one or more aspects of the various embodiments.

FIG. 1 is a block diagram of a computing system 100 configured to implement one or more aspects of the various embodiments. As shown, computing system 100 includes, without limitation, a central processing unit (CPU) 102 and a system memory 104 coupled to an accelerator processing subsystem 112 via a memory bridge 105 and/or a communication path 113. Memory bridge 105 is further coupled to an I/O (input/output) bridge 107 via a communication path 106, and/or I/O bridge 107 is, in turn, coupled to a switch 116.

In operation, I/O bridge 107 is configured to receive user input information from input devices 108, such as a keyboard or a mouse, and/or forward the input information to CPU 102 for processing via communication path 106 and/or memory bridge 105. In some examples, without limitation, input devices 108 are employed to verify the identities of one or more users in order to permit access of computing system 100 to authorized users and/or deny access of computing system 100 to unauthorized users. Switch 116 is configured to provide connections between I/O bridge 107 and/or other components of the computing system 100, such as a network adapter 118 and/or various add-in cards 120 and 121. In some examples, without limitation, network adapter 118 serves as the primary or exclusive input device to receive input data for processing via the disclosed techniques.

As also shown, I/O bridge 107 is coupled to a system disk 114 that may be configured to store content and/or applications and/or data for use by CPU 102 and/or accelerator processing subsystem 112. As a general matter, system disk 114 provides non-volatile storage for applications and/or data and may include fixed or removable hard disk drives, flash memory devices, and/or CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and/or the like, may be connected to I/O bridge 107 as well.

In various embodiments, memory bridge 105 may be a Northbridge chip, and/or I/O bridge 107 may be a Southbridge chip. In addition, communication paths 106 and/or 113, as well as other communication paths within computing system 100, may be implemented using any technically suitable protocols, including, without limitation, Peripheral Component Interconnect Express (PCIe), HyperTransport, or any other bus or point-to-point communication protocol known in the art.

In some embodiments, accelerator processing subsystem 112 comprises a graphics subsystem that delivers pixels to a display device 110 that may be any conventional cathode ray tube, liquid crystal display, light-emitting diode display, or the like. In such embodiments, the accelerator processing subsystem 112 incorporates circuitry optimized for graphics and/or video processing, including, for example, without limitation, video output circuitry. As described in greater detail herein in FIG. 2, such circuitry may be incorporated across one or more accelerators included within accelerator processing subsystem 112. An accelerator includes any one or more processing units that can execute instructions such as a central processing unit (CPU), a parallel processing unit (PPU) of FIGS. 2-4, a graphics processing unit (GPU), a direct memory access (DMA) unit, an intelligence processing unit (IPU), neural processing unit (NAU), tensor processing unit (TPU), neural network processor (NNP), a data processing unit (DPU), a vision processing unit (VPU), an application specific integrated circuit (ASIC), a field-programmable gate array (FPGA), and/or the like.

In some embodiments, accelerator processing subsystem 112 includes two processors, referred to herein as a primary processor (normally a CPU) and/or a secondary processor. Typically, the primary processor is a CPU and/or the secondary processor is a GPU. Additionally or alternatively, each of the primary processor and/or the secondary processor may be any one or more of the types of accelerators disclosed herein, in any technically feasible combination. The secondary processor receives secure commands from the primary processor via a communication path that is not secured. The secondary processor accesses a memory and/or other storage system, such as such as system memory 104, Compute eXpress Link (CXL) memory expanders, memory managed disk storage, on-chip memory, and/or the like. The secondary processor accesses this memory and/or other storage system across an insecure connection. The primary processor and/or the secondary processor may communicate with one another via a GPU-to-GPU communications channel, such as Nvidia Link (NVLink). Further, the primary processor and/or the secondary processor may communicate with one another via network adapter 118. In general, the distinction between an insecure communication path and/or a secure communication path is application dependent. A particular application program generally considers communications within a die or package to be secure. Communications of unencrypted data over a standard communications channel, such as PCIe, are considered to be unsecure.

In some embodiments, the accelerator processing subsystem 112 incorporates circuitry optimized for general purpose and/or compute processing. Again, such circuitry may be incorporated across one or more accelerators included within accelerator processing subsystem 112 that are configured to perform such general purpose and/or compute operations. In yet other embodiments, the one or more accelerators included within accelerator processing subsystem 112 may be configured to perform graphics processing, general purpose processing, and/or compute processing operations. System memory 104 includes at least one device driver 103 configured to manage the processing operations of the one or more accelerators within accelerator processing subsystem 112.

In various embodiments, accelerator processing subsystem 112 may be integrated with one or more other the other elements of FIG. 1 to form a single system. For example, without limitation, accelerator processing subsystem 112 may be integrated with CPU 102 and/or other connection circuitry on a single chip to form a system on chip (SoC).

It will be appreciated that the system shown herein is illustrative and that variations and/or modifications are possible. The connection topology, including the number and/or arrangement of bridges, the number of CPUs 102, and/or the number of accelerator processing subsystems 112, may be modified as desired. For example, without limitation, in some embodiments, system memory 104 may be connected to CPU 102 directly rather than through memory bridge 105, and/or other devices would communicate with system memory 104 via memory bridge 105 and/or CPU 102. In other alternative topologies, accelerator processing subsystem 112 may be connected to I/O bridge 107 or directly to CPU 102, rather than to memory bridge 105. In still other embodiments, I/O bridge 107 and/or memory bridge 105 may be integrated into a single chip instead of existing as one or more discrete devices. Lastly, in certain embodiments, one or more components shown in FIG. 1 may not be present. For example, without limitation, switch 116 may be eliminated, and/or network adapter 118 and/or add-in cards 120, 121 would connect directly to I/O bridge 107.

Figure 2:
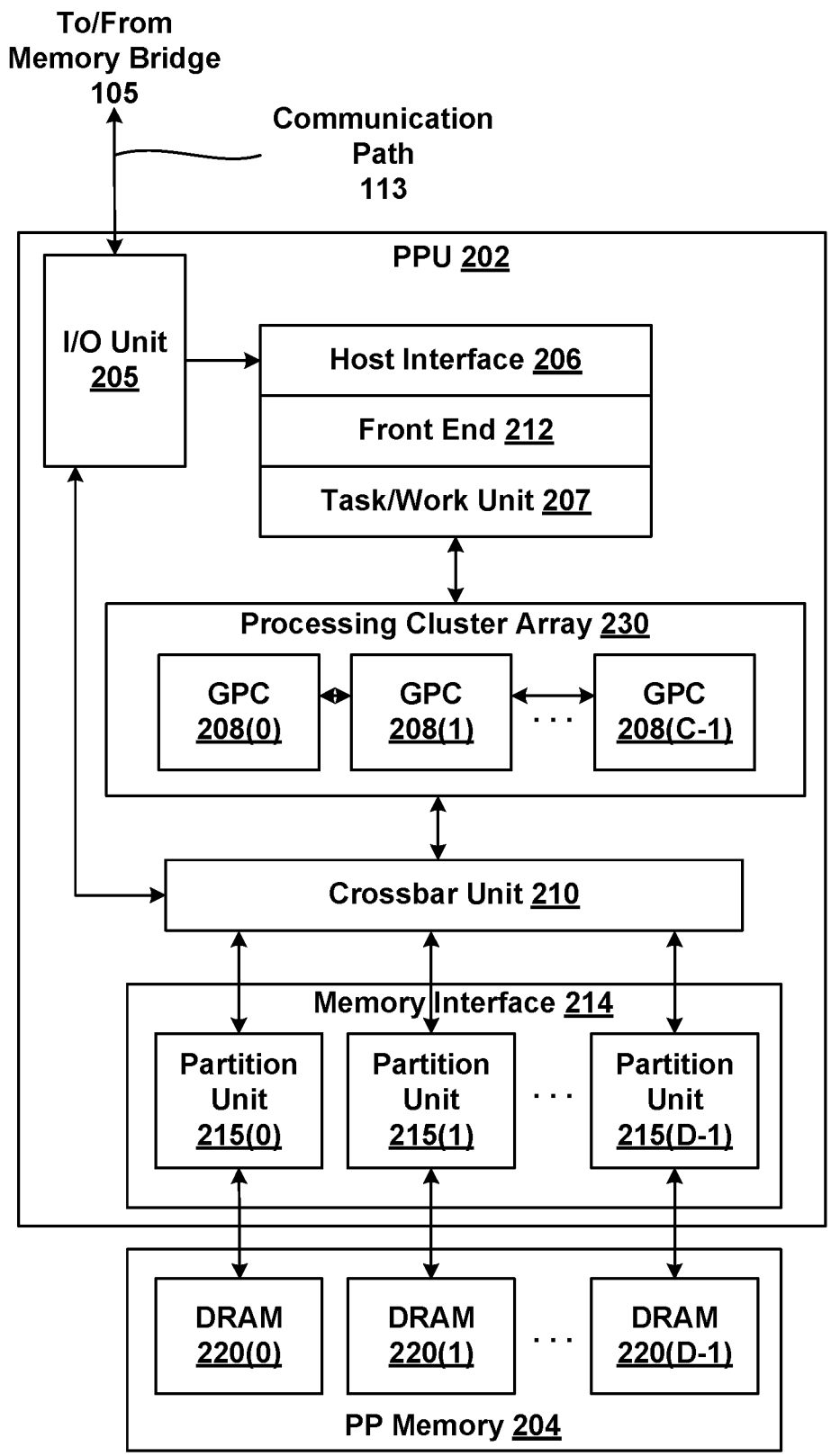
FIG. 2 is a block diagram of a parallel processing unit (PPU) included in the accelerator processing subsystem of FIG. 1, according to various embodiments.

FIG. 2 is a block diagram of a parallel processing unit (PPU) 202 included in the accelerator processing subsystem 112 of FIG. 1, according to various embodiments. Although FIG. 2 depicts one PPU 202, as indicated herein, accelerator processing subsystem 112 may include any number of PPUs 202. Further, the PPU 202 of FIG. 2 is one non-limiting example of an accelerator included in accelerator processing subsystem 112 of FIG. 1. Alternative accelerators include, without limitation, CPUs, GPUs, DMA units, IPUs, NPUs, TPUs, NNPs, DPUs, VPUs, ASICs, FPGAs, and/or the like. The techniques disclosed in FIGS. 2-4 with respect to PPU 202 apply equally to any type of accelerator(s) included within accelerator processing subsystem 112, in any combination. As shown, PPU 202 is coupled to a local parallel processing (PP) memory 204. PPU 202 and/or PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and/or update pixel data and/or deliver final pixel data or display frames to display device 110 for display. In some embodiments, PPU 202 also may be configured for general-purpose processing and/or compute operations.

In operation, CPU 102 is the master processor of computing system 100, controlling and/or coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and/or PPU 202. Additionally or alternatively, processors and/or accelerators other than CPU 102 may write one or more streams of commands for PPU 202 to a data structure. A pointer to the data structure is written to a pushbuffer to initiate processing of the stream of commands in the data structure. The PPU 202 reads command streams from the pushbuffer and/or then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computing system 100 via the communication path 113 and/or memory bridge 105. I/O unit 205 generates packets (or other signals) for transmission on communication path 113 and/or also receives all incoming packets (or other signals) from communication path 113, directing the incoming packets to appropriate components of PPU 202. For example, without limitation, commands related to processing tasks may be directed to a host interface 206, while commands related to memory operations (e.g., reading from or writing to PP memory 204) may be directed to a crossbar unit 210. Host interface 206 reads each pushbuffer and/or transmits the command stream stored in the pushbuffer to a front end 212.

As mentioned herein in conjunction with FIG. 1, the connection of PPU 202 to the rest of computing system 100 may be varied. In some embodiments, accelerator processing subsystem 112, which includes at least one PPU 202, is implemented as an add-in card that can be inserted into an expansion slot of computing system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and/or stored in memory. The pointers to TMDs are included in a command stream that is stored as a pushbuffer and received by the front end 212 from the host interface 206. Processing tasks that may be encoded as TMDs include indices associated with the data to be processed as well as state parameters and/or commands that define how the data is to be processed. For example, without limitation, the state parameters and/or commands may define the program to be executed on the data. The task/work unit 207 receives tasks from the front end 212 and/or ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \leq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≤1. Each partition unit 215 is coupled to one or more dynamic random access memories (DRAMs) 220 residing within PP memory 204. In one embodiment, the number of partition units 215 equals the number of DRAMs 220, and/or each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and/or frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and/or partition units 215.

Again, GPCs 208 can be programmed to execute processing tasks relating to a wide variety of applications, including, without limitation, linear and/or nonlinear data transforms, filtering of video and/or audio data, modeling operations (e.g., applying laws of physics to determine position, velocity, and/or other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and/or write result data back to system memory 104 and/or PP memory 204. The result data may then be accessed by other system components, including CPU 102, another PPU 202 within accelerator processing subsystem 112, or another accelerator processing subsystem 112 within computing system 100.

As noted herein, any number of PPUs 202 may be included in an accelerator processing subsystem 112. For example, without limitation, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, without limitation, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and/or form factors, including, without limitation, desktops, laptops, handheld personal computers or other handheld devices, servers, workstations, game consoles, embedded systems, and/or the like.

Figure 3:
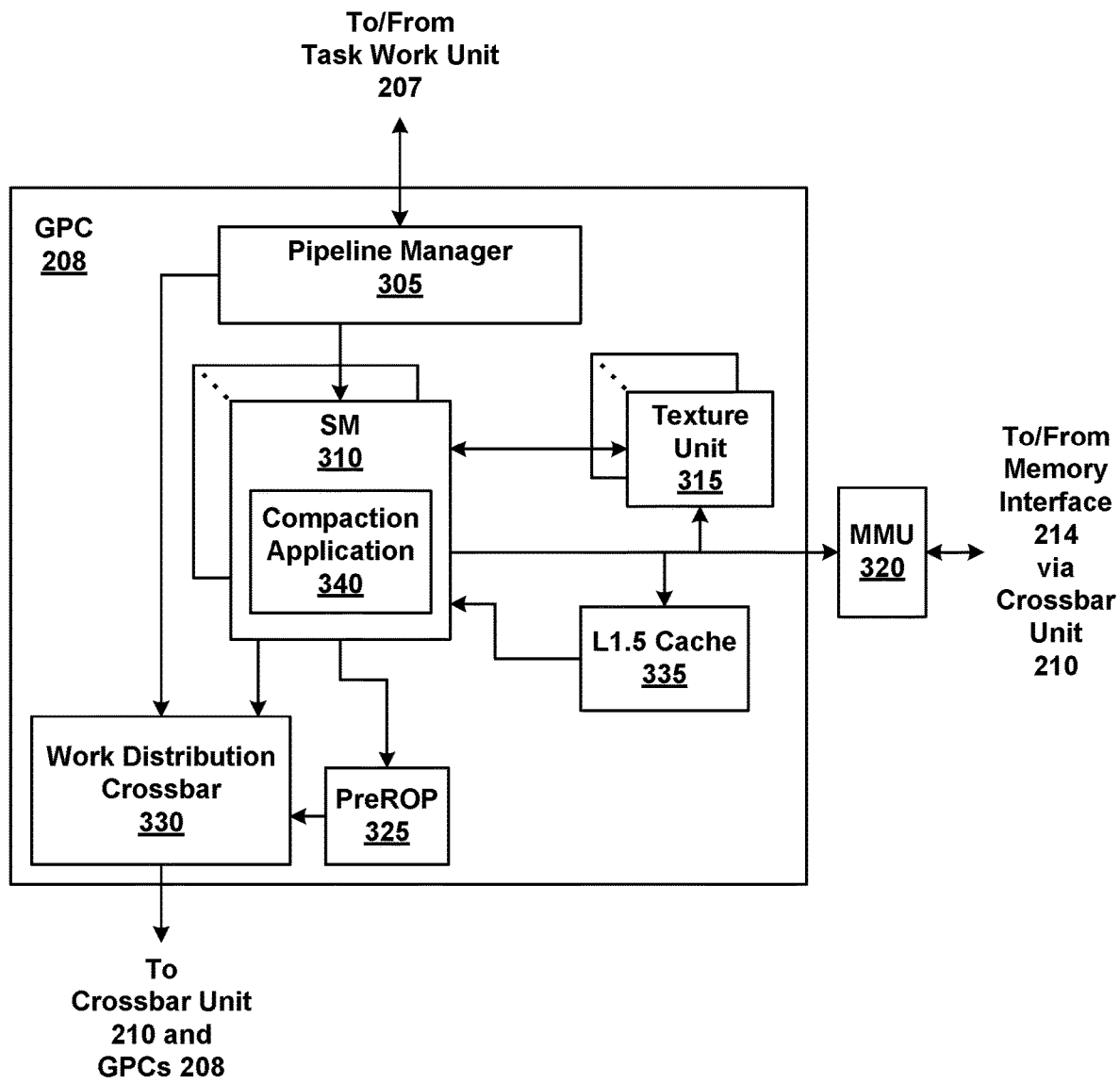
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of Q SMs 310, where Q≤1. Also, each SM 310 includes a set of functional execution units (not shown), such as execution units and/or load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and/or floating point arithmetic (e.g., addition and/or multiplication), comparison operations, Boolean operations (e.g., AND, OR, XOR), bit-shifting, and/or computation of various algebraic functions (e.g., planar interpolation and/or trigonometric, exponential, and/or logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*Q thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to q*k, where k is the number of concurrently executing threads in a thread group, which is typically an integer multiple of the number of execution units within the SM 310, and q is the number of thread groups simultaneously active within the SM 310. In various embodiments, a software application written in the compute unified device architecture (CUDA) programming language describes the behavior and/or operation of threads executing on GPC 208, including any of the behaviors and/or operations described herein. A given processing task may be specified in a CUDA program such that the SM 310 may be configured to perform and/or manage general-purpose compute operations.

Although not shown in FIG. 3, each SM 310 contains a level one (L1) cache or uses space in a corresponding L1 cache outside of the SM 310 to support, among other things, load and/or store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and/or configured to receive and/or hold data requested from memory via memory interface 214 by SM 310. Such data may include, without limitation, instructions, uniform data, and/or constant data. In embodiments having multiple SMs 310 within GPC 208, the SMs 310 may beneficially share common instructions and/or data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and/or optionally a cache line index. The MMU 320 may include address translation lookaside buffers (TLB) or caches that may reside within SMs 310, within one or more L1 caches, or within GPC 208.

In graphics and/or compute applications, GPC 208 may be configured such that each SM 310 is coupled to a texture unit 315 for performing texture mapping operations, such as determining texture sample positions, reading texture data, and/or filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and/or perform address translations.

In addition, SM 310 includes a compaction application 340 stored in a memory of SM 310. Compaction application 340, when executed by SM 310, performs one or more operations associated with the techniques further described herein. When performing the operations associated with the disclosed techniques, compaction application 340 stores data in and/or retrieves data from memory, such as a local memory shared by one or more SMs 310, a cache memory, parallel processing memory 204, system memory 104, and/or the like.

Further, when performing the operations associated with the disclosed techniques, compaction application 340 may operate on various data structures when performing the operations described herein. These data structures may include the data structure(s) of data included in an input array that is received and compacted by compaction application 340, the data structure(s) of data included in one or more buffer arrays generated by compaction application 340, the data structure(s) of one or more counters used by compaction application 340, and/or the like. In some embodiments, the layout of data included in the data structures, the lifetime of the data structures, and/or the like can vary within the scope of the present disclosure.

In operation, compaction application 340 receives and compacts an input array of N data entries. In one non-limiting example, compaction application 340 retrieves the input array from memory, such as a local memory shared by one or more SMs 310, a cache memory, parallel processing memory 204, system memory 104, and/or the like, and compacts the input array. In another non-limiting example, compaction application 340 receives the input array from another application, such as an edge collapse application or a three-dimensional mesh topology generation application, that generated the input array.

As will be described in more detail herein, when compacting an input array of N data entries, compaction application 340 reduces the number of data entries included in the input array from N data entries to a number of data entries that is less than N. For example, without limitation, compaction application 340 compacts, or reduces the number of data entries included in, the input array by removing any invalid data entries from the input array. A data element in the input array may be considered invalid, for example, without limitation, when the data element has a value of zero or some other value that is unnecessary and/or not used for further processing of the input array.

In some instances, compaction application 340 receives and compacts a sparse array. A sparse array is an array of data entries in which many of the data entries have a value of zero. Large sparse arrays may be generated in various computing applications, including, without limitation, machine learning applications and/or graphics processing applications. In such computing applications, it may be desirable to compact the large sparse array to reduce the amount of memory needed to store the large sparse array and/or reduce the amount of computing time needed to further process and/or perform operations with the large sparse array. One non-limiting example of a large sparse array is an array that is used to generate a three-dimensional mesh topology. Another non-limiting example of a large sparse array, without limitation, is an array that is used to decimate edges of a three-dimensional mesh topology.

Figure 4:
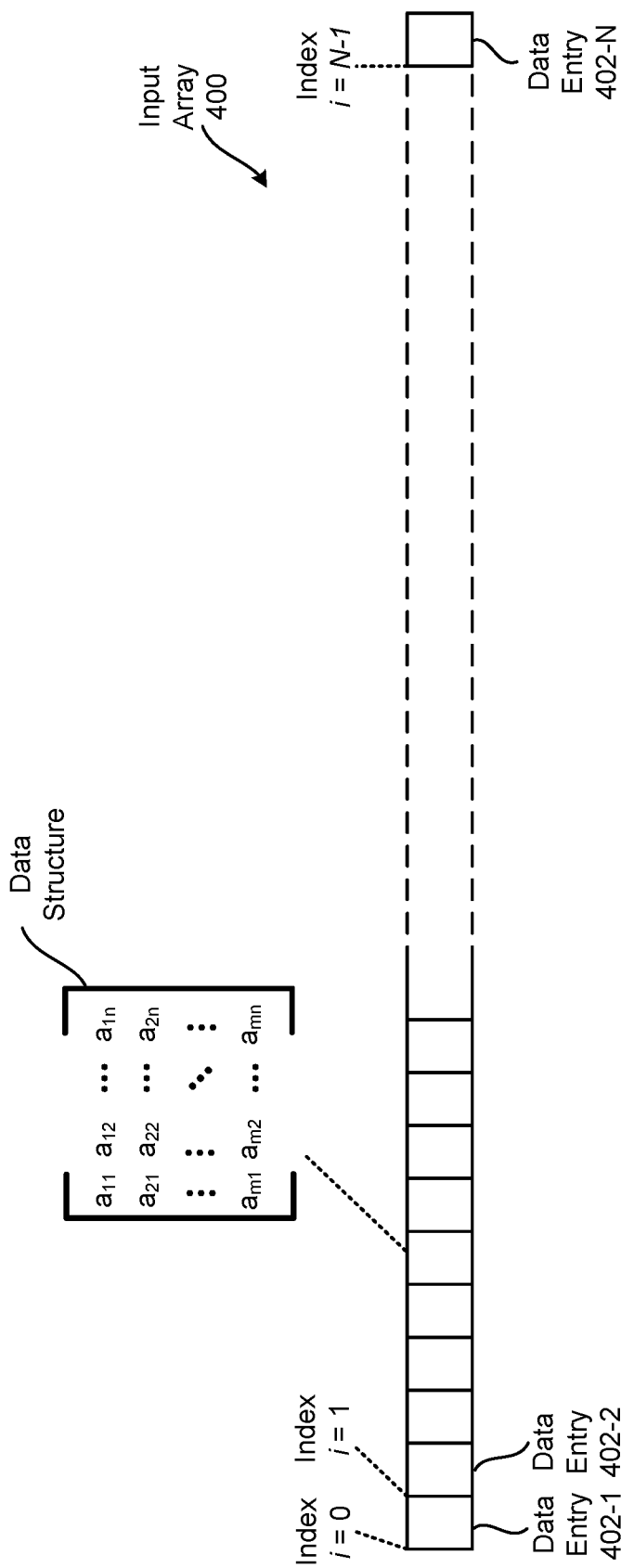
FIG. 4 illustrates an example input array, according to various embodiments.

FIG. 4 illustrates an example input array 400 that may be received and compacted by compaction application 340, according to various embodiments. As shown, input array 400 includes N data entries 402-1-402-N. In the illustrated example, the data structure of a particular data element 402 included in input array 400 is shown as a matrix. However, persons skilled in the art will understand that input array 400 may include data entries 402-1-402-N having one or more other types of data structures. For example, without limitation, a data element 402 included in input array 400 may comprise, without limitation, one or more of arrays, stacks, queues, linked lists, binary trees, graphs, tries, hash tables, or some other type of data structure.

Each data element 402 included in input array 400 is stored at a respective position, or index i, in input array 400. According to the embodiments described herein, the first index i of input array 400 is zero. Accordingly, the index i of the first data element 402-1 included in input array 400 is zero, the index i of the second data element 402-2 included in input array 400 is one, . . . , and the index i of the Nth data element 402-N included in input array 400 is N−1.

Furthermore, each data element 402 included in input array 400 has a respective size and value. The size of a data element 402 corresponds to the amount of space in memory that is needed to store the data element 402. In some embodiments, each data element 402 included in input array 400 is of the same size. The value of a data element 402 corresponds to the value of the contents included in the data element 402. In operation, compaction application 340 determines whether the value of a data element 402 is valid or invalid. A data element 402 included in input array 400 may be invalid, for example, without limitation, if the value of the data element 402 is zero or if the value of the data element 402 is some other value that is unnecessary and/or not used for further processing of input array 400.

In some embodiments, compaction application 340 executes a function isValid(i) to determine whether a data element 402 positioned at index i in input array 400 is valid. The isValid(i) function may be, for example, without limitation, a user-defined function that returns a Boolean value that indicates whether the data element 402 at index i in input array 400 is valid. For example, the isValid(i) function may return a Boolean value of true, or 1, when the data element 402 positioned at index i in input array 400 is valid. Likewise, the isValid(i) function may return a Boolean value of false, or 0, when the data element 402 positioned at index i in input array 400 is invalid. For instances in which input array 400 is a sparse array, the isValid(i) function may return a Boolean value of true, or 1, when the data element 402 at index i in input array 400 is non-zero and return a Boolean value of false, or 0, when the data element 402 at index i in input array 400 is zero When compacting an input array, such as input array 400, compaction application 340 generates one or more buffer arrays that are used for tracking the respective indices i of valid and invalid data entries included in input array. Compaction application 340 may store the one or more buffer arrays in memory, such as a local memory shared by one or more SMs 310, a cache memory, parallel processing memory 204, system memory 104, and/or the like. The amount of space in memory needed to store a particular buffer array is significantly smaller than the amount of space in memory needed to store the input array for which the buffer array is used to track the respective indices i of valid and invalid data entries.

Figure 5:
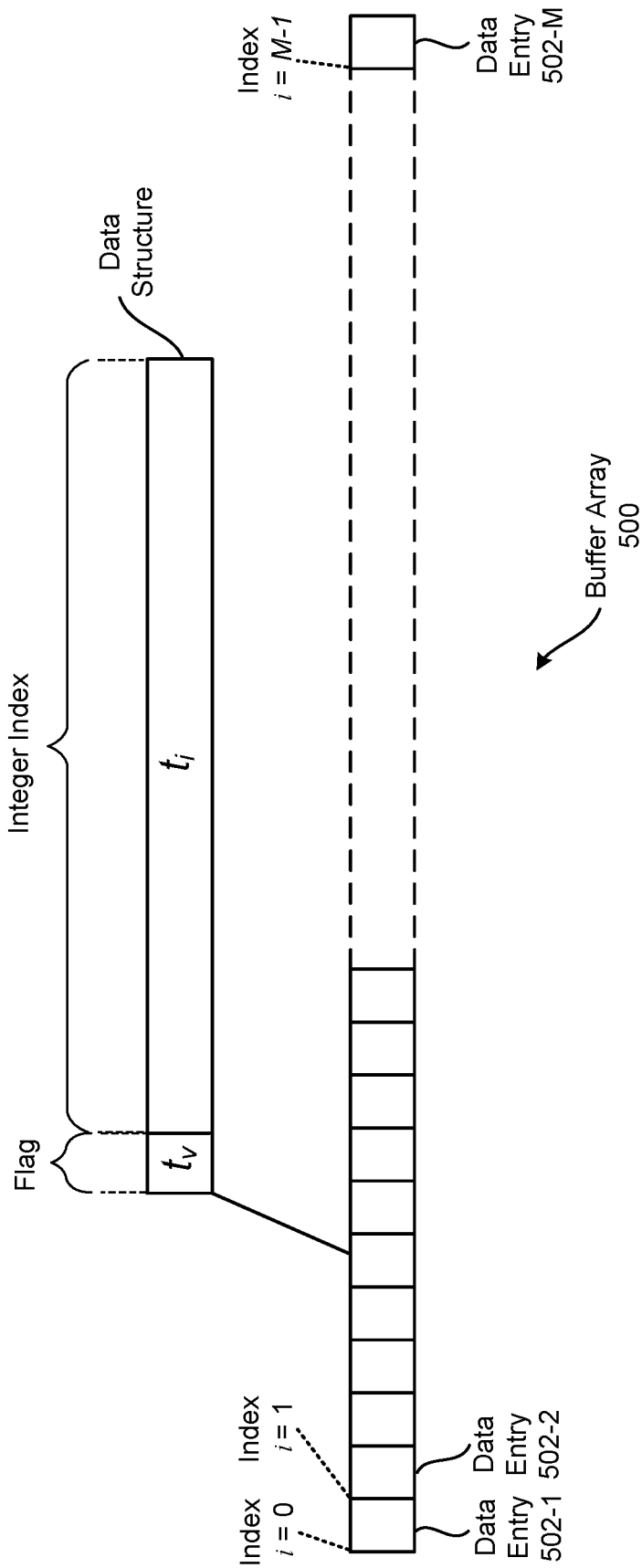
FIG. 5 illustrates an example buffer array, according to various embodiments.

FIG. 5 illustrates an example buffer array 500 that may be generated by compaction application 340, according to various embodiments. As shown, buffer array 500 includes M data entries 502-1-502-M. In some embodiments, the number M of data entries 502 included in buffer array 500 is equal to the number N of data entries 402 included in input array 400. That is, in some embodiments, compaction application 340 generates a buffer array 500 that includes the same number of data entries as input array 400. As will be described in more detail herein, in other embodiments, the number M of data entries 502 included in buffer array 500 is less than the number N of data entries 402 included in input array 400. That is, in some embodiments, compaction application 340 generates a buffer array 500 that includes less data entries than input array 400.

Similar to input array 400, each data element 502 included in buffer array 500 is stored at a respective position, or index i, in buffer array 500. According to the embodiments described herein, the first index i in buffer array 500 is zero. Accordingly, the index i of the first data element 502-1 included in buffer array 500 is zero, the index i of the second data element 502-2 included in buffer array 500 is one, . . . , and the index i of the Mth data element 502-M included in buffer array 500 is M−1.

In the illustrated example, the data structure of each data element 502 included in buffer array 500 is an unsigned integer in which the lowest bits of the unsigned integer are an unsigned integer index $t_i$ that corresponds to an index i of an input array and the highest bit of the unsigned integer is a Boolean flag $t_v$ that indicates whether the data element at the index i=$t_i$ in input array is valid. Compaction application 340 sets the value of the Boolean flag $t_v$ of a respective data element 502 to false, or 0, when the data element at the index i=$t_i$ in input array is invalid. Likewise, compaction application 340 sets the value of the Boolean flag $t_v$ of a respective data element 502 to true, or 1, when the data element at the index i=$t_i$ in input array is valid.

As a non-limiting example, it will be assumed that buffer array 500 is used to track whether the data entries 402-1-402-N included in input array 400 are valid. Furthermore, in this non-limiting example, it will be assumed that the first data element 502-1 included in buffer array 500 corresponds to the first data element 402-1 included in input array 400. Accordingly, in this non-limiting example, the lowest bits of the unsigned integer included in the first data element 502-1 in buffer array 500 are an integer index $t_i$ that represents the index i of the first data element 402-1 in input array 400. As the first data element 402-1 is stored at index i=0 in input array 400, compaction application 340 sets the integer index $t_i$ of the data element 502-1 to have a value of zero.

Continuing with this non-limiting example, compaction application 340 further determines whether the first data element 402-1 in input array 400 is valid before setting the value of the Boolean flag $t_v$ stored in the highest bit of the first data element 502-1 in buffer array 500. For example, compaction application 340 executes function isValid(i=0) to determine whether the first data element 402-1 in input array 400 is valid. If compaction application 340 determines that the first data element 402-1 in input array 400 is valid, compaction application 340 sets the value of the Boolean flag $t_v$ included in the first data element 502-1 in buffer array 500 to true, or 1. If compaction application 340 determines that the first data element 402-1 in input array 400 is invalid, compaction application 340 sets the value of the Boolean flag $t_v$ included in the first data element 502-1 in buffer array 500 to false, or 0.

As described herein, the size of the data entries 502-1-502-M included in a buffer array 500 is independent of the size of the data entries included in an input array that is compacted by compaction application 340. Therefore, in the general case, each data element 502 included in a buffer array 500 consumes less space in memory than a data element included in an input array. Moreover, the entire buffer array 500 consumes less space in memory than a corresponding input array. In one non-limiting example, the data structure of a data element 502 included in buffer array 500 is implemented as an unsigned 32-bit integer in which the lowest 31 bits of the data element 502 are an integer index $t_i$ that represents an index i of an input array and the highest bit of the data element 502 is a Boolean flag $t_v$ that indicates whether the data element at the index i=$t_i$ in input array is valid. In other non-limiting examples, the data structure of data element 502 included in buffer array 500 is implemented as an unsigned integer of a different size (e.g., 64-bit, 128-bit, etc.). In some embodiments, the data structure of a data element 502 included in buffer array 500 is some other type of data structure that can be used to represent the index i of a data element in an input array and the corresponding validity of that data element the input array.

In some embodiments, when compacting an input array, compaction application 340 generates and/or uses more than one buffer array to track the respective indices i of valid and/or invalid data entries included in input array. In some embodiments, compaction application 340 generates a first buffer array that is used to track the respective indices i of data entries included in input array and generates a second buffer array that tracks whether the data entries included in input array are valid. For example, without limitation, each data element included in the first buffer array may be an unsigned integer that represents the index i of a particular data element included in the input array and/or each data element included in the second buffer array may be an unsigned integer, such as a Boolean flag, that indicates whether the particular data element in the input array is valid.

When compacting an input array, compaction application 340 may also use one or more unsigned integer counters to track valid and invalid data entries included in an input array. In one non-limiting example, compaction application 340 uses a first counter $c_v$ to count a number of valid data entries included in an input array. Continuing with this non-limiting example, compaction application 340 further uses a second counter $c_i$ and a third counter c for task tracking. In other non-limiting examples, compaction application 340 uses more or less than three unsigned integer counters when compacting an input array. In operation, compaction application 340 may store the one or more unsigned integer counters in memory, such as a local memory shared by one or more SMs 310, a cache memory, parallel processing memory 204, system memory 104, and/or the like.

Lock-Free Unordered In-Place Compaction

FIGS. 6-9 illustrate a non-limiting example of a compaction process 600 that is implemented by compaction application 340 to compact an input array, such as input array 400, according to various embodiments. As described herein, input array 400 includes N data entries 402-1-402-N. Moreover, as described herein, each data element 402 included in input array 400 is stored at a respective position, or index i, in input array 400. For example, without limitation, the index i of the first data element 402-1 included in input array 400 is zero, the index i of the second data element 402-2 included in input array 400 is one, . . . , and the index i of the Nth data element 402-N included in input array 400 is N–1.

When implementing compaction process 600, compaction application 340 generates and/or uses a buffer array 500 that includes M data entries 502-1-502-M. As described herein, each data element 502 included in buffer array 500 is stored at a respective position, or index i, in buffer array 500. For example, without limitation, the index i of the first data element 502-1 included in buffer array 500 is zero, the index i of the second data element 502-2 included in buffer array 500 is one, . . . , and the index i of the Mth data element 502-M included in buffer array 500 is M–1.

The number M of data entries 502-1-502-M in buffer array 500 used in compaction process 600 is equal to the number N of data entries 402-1-402-N included in input array 400. That is, when implementing compaction process 600, compaction application 340 generates and/or uses a buffer array 500 that includes the same number of data entries as input array 400 that is being compacted. However, as will be described in more detail herein, in some embodiments, compaction application 340 generates and/or uses a buffer array 500 that includes less data entries than the input array that is being compacted.

As further described herein, each data element 502 included in buffer array 500 is an unsigned integer in which the lowest bits are an integer index $t_i$ that represent an index i of input array 400 and the highest bit of the integer is a Boolean flag $t_v$ that indicates whether the data element 402 at the index i of input array 400 is valid. Because the number of data entries 502 included in buffer array 500 used in compaction process 600 is equal to the number of data entries 402 included in input array 400, each data element 502 included in buffer array 500 corresponds to a respective data element 402 included in input array 400. That is, the unsigned integer included in each data element 502 in buffer array 500 corresponds to the respective index i and validity of a corresponding data element 402 included in input array 400.

In one non-limiting example, before implementing compaction process 600, compaction application 340 generates a buffer array 500 such that a data element 502 positioned at an index i=i in buffer array 500 corresponds to the data element 402 positioned at the index i in input array 400 before compaction process 600 begins. Thus, in this non-limiting example, the first data element 502-1 that is positioned at index i=0 in buffer array 500 corresponds to the first data element 402-1 that is positioned at index i=0 in input array 400. Accordingly, the first data element 502-1 in buffer array 500 is an unsigned integer in which the lower bits of the unsigned integer are an integer index $t_i$ that is equal to the index i of the first data element 402-1 in input array 400 (e.g., index i=0). The highest bit of the unsigned integer is a Boolean flag $t_v$ that indicates whether the first data element 402-1 in input array 400 is valid. Similarly, in this non-limiting example, the second data element 502-2 that is positioned at index i=1 in buffer array 500 corresponds to the second data element 402-2 that is positioned at index i=1 in input array 400. Accordingly, the second data element 502-2 in buffer array 500 is an unsigned integer in which the lower bits of the unsigned integer are an integer index $t_i$ that is equal to the index i of the second data element 402-2 included in input array 400 (e.g., index i=1). The highest bit of the unsigned integer is a Boolean flag $t_v$ that indicates whether the second data element 402-2 in input array 400 is valid.

Before implementing compaction process 600, compaction application 340 initializes the values of the unsigned integer counters $c_v$, $c_i$, and c to zero. In some instances, before implementing compaction process 600, compaction application 340 also initializes the values of the respective Boolean flags $t_v$ included in the data entries 502 in buffer array 500 to zero. However, initializing the values of the respective Boolean flags $t_v$ included in the data entries 502 in buffer array 500 to zero is optional, as compaction application 340 will set the value of each Boolean flag $t_v$ included in the data entries 502 in buffer array 500 when implementing a first pass of compaction process 600.

Figure 6:
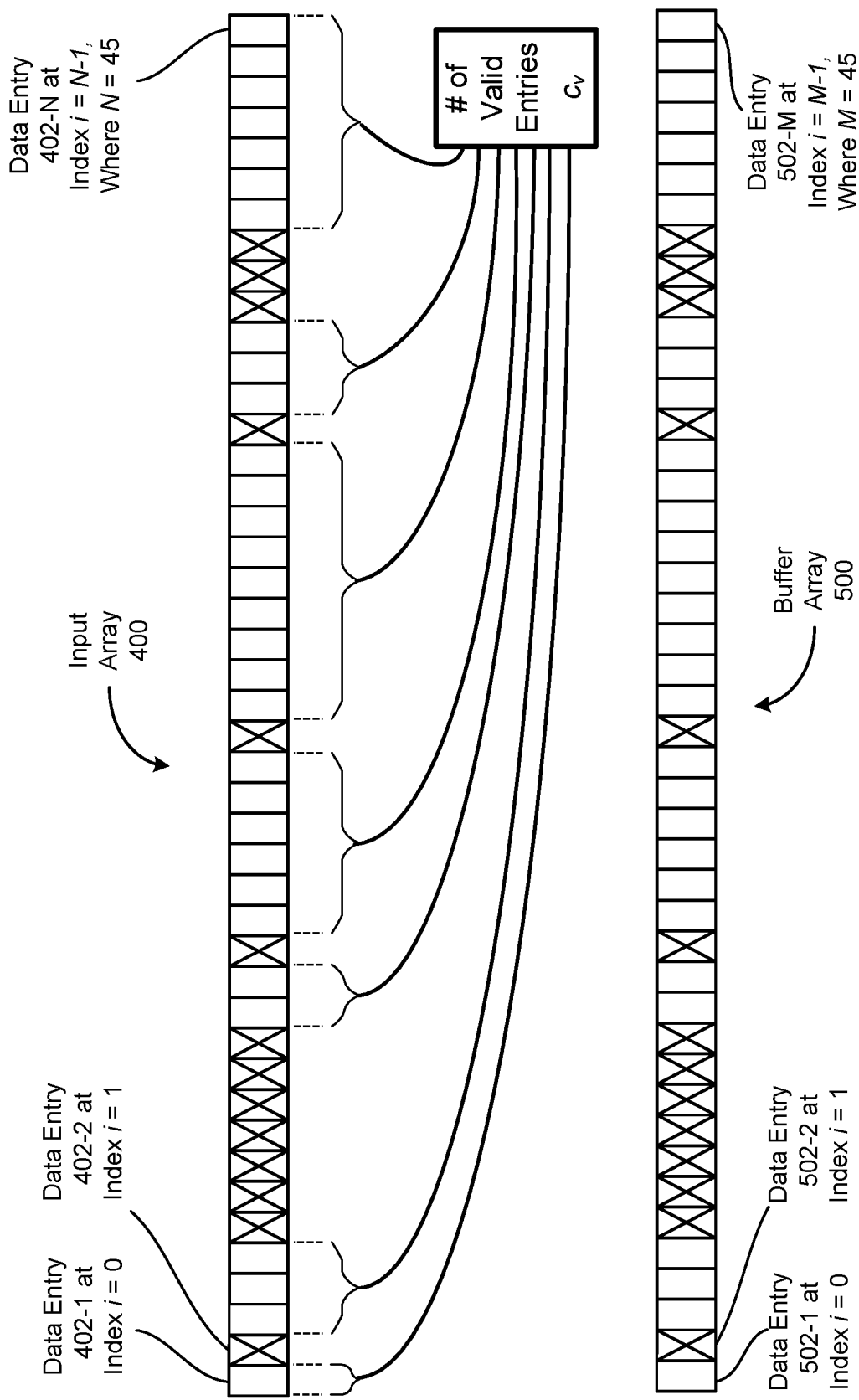
FIG. 6 illustrates an example result of a first pass of a compaction process, according to various embodiments.

In the illustrated example of FIGS. 6-9, the number N of entries 402 included in input array 400 is shown to be 45. However, persons skilled in the art will understand that the number N of data entries 402 included in input array 400, as illustrated in FIGS. 6-9, is a non-limiting example. Moreover, persons skilled in the art will understand that the number N of data entries 402 included in input array 400 may be less than 45 or greater than 45. Furthermore, valid data entries 402 included in input array 400 are illustrated as blank boxes and invalid data entries 402 included in input array 402 are illustrated as boxes filled in with an "X." As shown in FIG. 6, input array 400 includes 31 valid data entries 402 and 14 invalid data entries 402. However, persons skilled in the art will understand that the number of valid data entries 402 included in input array 400 and/or the number of invalid data entries 402 included in input array 400, as illustrated in FIGS. 6-9, are non-limiting examples. Moreover, persons skilled in the art will understand that input array 400 may include less than or more than 31 valid data entries 402. Similarly, persons skilled in the art will understand that input array 400 may include less than or more than 14 invalid data entries 402.

In the illustrated example of FIGS. 6-9, data entries 502 in buffer array 500 for which the Boolean flags $t_v$ are true, or set to 1, are also illustrated as blank boxes. In addition, data entries 502 in buffer array 500 for which the Boolean flags $t_v$ are false, or set to 0, are illustrated as boxes filled in with an "X."

FIG. 6 illustrates a non-limiting example result of the first pass of compaction process 600, according to various embodiments. That is, FIG. 6 illustrates the respective states of input array 400 and buffer array 500 after compaction application 340 has completed the first pass of compaction process 600.

When implementing the first pass of compaction process 600, compaction application 340 counts, for example using the first counter $c_v$, the number of valid data entries 402 included in input array 400. Furthermore, when implementing the first pass of compaction process 600, compaction application 340 sets the Boolean flag $t_v$ included in each data element 502 according to whether the corresponding data element 402 included in input array 400 is valid. By the end of the first pass of compaction process 600, the value of the first counter $c_v$ is equal to the number of valid data entries 402 included in input array 400. In addition, by the end of the first pass of compaction process 600, the Boolean flag $t_v$ included in each data element 502 in buffer array 500 has been set according to whether the corresponding data element 402 in input array 400 is valid.

In one non-limiting example implementation of the first pass of compaction process 600, compaction application 340 evaluates the validity of the data entries 402 positioned at indices i ∈ {$c_v$–N–1} in input array 400. As described herein, the value of the first counter $c_v$ is initialized to zero before implementing the first pass of compaction process 600. Thus, compaction application 340 determines the validity of each data element 402 included in input array 400. Compaction application 340 may, for example, execute the isValid(i) function on the data entries 402 positioned at indices i∈{$c_v$–N–1} in input array 400 to determine the respective validity of each data element 402 included in input array 400.

When compaction application 340 executes the isValid (i) function on a data element 402, compaction application 340 sets the Boolean flag $t_v$ included in the corresponding data element 502 according to the result of the isValid(i) function. Thus, when the result of the isValid (i) function executed on a data element 402 included in input array 400 is true (e.g., the data element 402 is valid), compaction application 340 sets the Boolean flag $t_v$ included in the corresponding data element 502 to true, or 1. Furthermore, when the result of the isValid (i) function executed on a data element 402 included in input array 400 is true (e.g., the data element 402 is valid), compaction application 340 increments the first counter $c_v$ by one to track the valid data element 402. In contrast, when the result of the isValid(i) function executed on a data element 402 included in input array is false (e.g., the data element 402 is invalid), compaction application 340 sets the Boolean flag $t_v$ included in the corresponding data element 502 to false, or 0. When the result of the isValid (i) function executed on a data element 402 included in input array 400 is false (e.g., the data element 402 is invalid), compaction application 340 does not increment the unsigned integer $c_v$.

With respect to the illustrated example of FIG. 6, the first data element 402-1 included in input array 400 is valid. Accordingly, when compaction application 340 executes the isValid(i=0) function on the first data element 402-1, a value of true, or 1, is returned. Therefore, compaction application 340 sets the value of the Boolean flag $t_v$ included in the first data element 502-1 in buffer array 500 to true, or 1, and increments the first counter $c_v$ by one to track the valid data element 402-1. As further shown in FIG. 6, the second data element 402-2 included in input array 400 is invalid. Accordingly, when compaction application 340 executes the isValid (i=1) function on the second data element 402-2 in input array 400, a value of false, or 0, is returned. Therefore, compaction application 340 sets the value of the Boolean flag $t_v$ included in the corresponding second data element 502-2 in buffer array 500 to false, or 0. Compaction application 340 does not increment the first counter $c_v$ by one since the second data element 402-2 is invalid.

As described herein, by the end of the first pass of compaction process 600, the value of the first counter $c_v$ is equal to the number of valid entries 402 included in input array 400. Furthermore, by the end of the first pass of compaction process 600, the Boolean flag $t_v$ included in each data element 502 in buffer array 500 has been set according to whether the corresponding data element 402 in input array 400 is valid. For example, without limitation, at the end of the first pass of compaction process 600, the Boolean flag $t_v$ included in the first data element 502-1 in buffer array 500 has been set according to whether the first data element 402-1 in input array 400 is valid, the Boolean flag $t_v$ included in the second data element 502-2 in buffer array 500 is set according to whether the second data element 402-2 in input array 400 is valid, . . . , and the Boolean flag $t_v$ included in the Mth data element 502-M in buffer array 500 is set according to whether the Nth data element 402-N in input array 400 is valid.

In some non-limiting examples, compaction application 340 may execute the first pass of compaction process 600 in parallel. In such non-limiting examples, compaction application 340 may atomically set the values of the Boolean flags $t_v$ included in the data entries 502-1-502-M in buffer array 500. When compared to sequential execution, parallel execution of the first pass of compaction process 600 is lock-free and requires less computing time.

Figure 7:
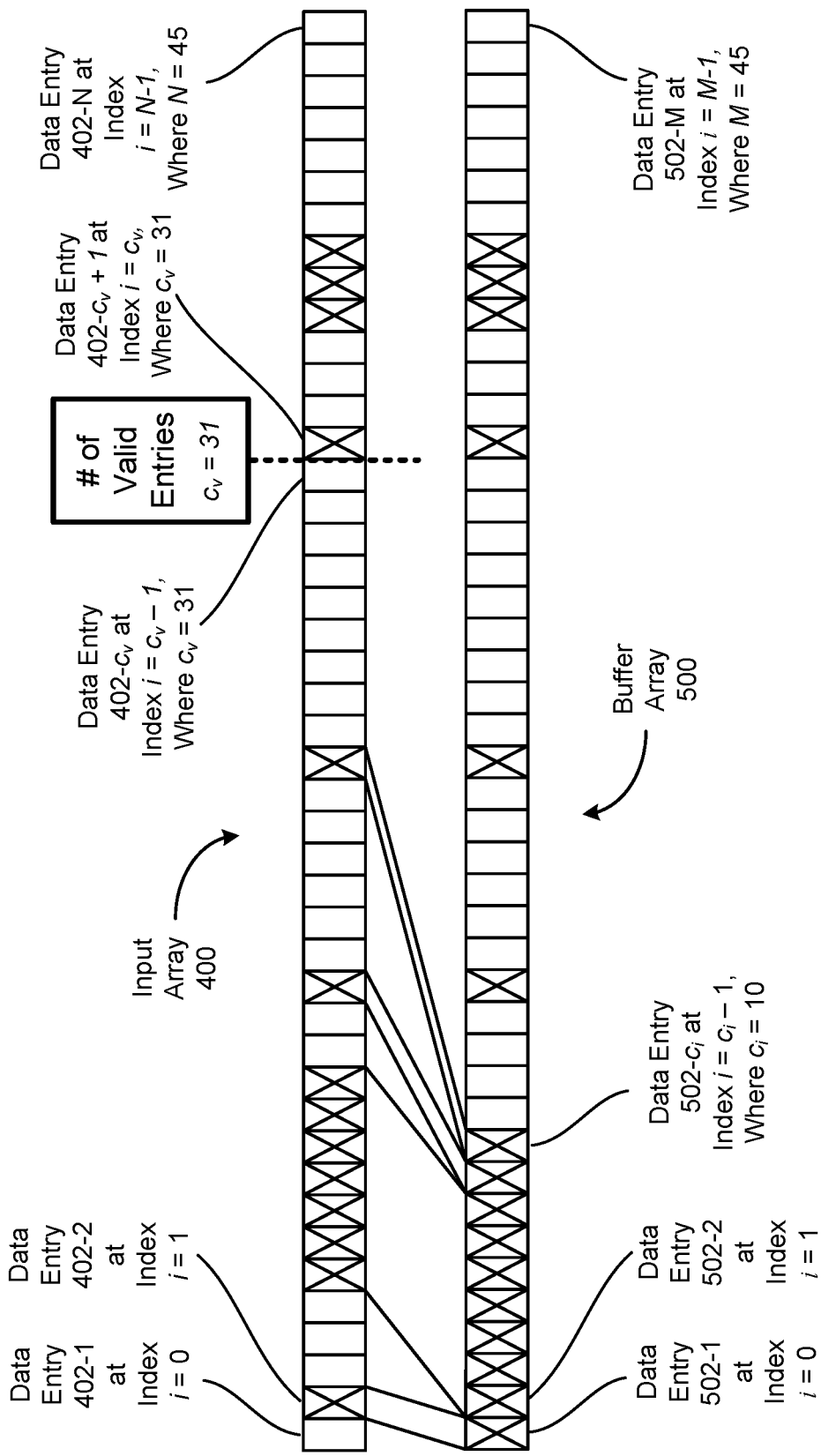
FIG. 7 illustrates an example result of a second pass of a compaction process, according to various embodiments.

After completing the first pass of compaction process 600, compaction application 340 implements the second pass of compaction process 600. FIG. 7 illustrates a non-limiting example result of the second pass of compaction process 600, according to various embodiments. That is, FIG. 7 illustrates the respective states of input array 400 and the buffer array 500 after compaction application 340 has completed the second pass of compaction process 600.

When implementing the second pass of compaction process 600, compaction application 340 divides input array 400 into a first portion and a second portion. The first portion of input array 400 includes the first $c_v$ data entries 402-1-402-$c_v$ included in input array 400. As described herein with respect to the first pass of compaction process 600, the value of the first counter is equal to the number of valid data entries 402 included in input array 400. Thus, the first portion of input array 400 includes as many data entries 402 as the number of valid data entries 402 included in input array 400. Moreover, the first portion of input array 400 includes indices i∈{0-$c_v$-1} of input array 400. As described herein, input array 400 includes 31 valid data entries 402 in the non-limiting illustrated example. Accordingly, with respect to the non-limiting illustrated example, the first portion of input array 400 is shown to include the first 31 data entries 402-1-402-31 included in input array 400.

The second portion of input array 400 includes the remaining data entries 402 of input array 400. Accordingly, the second portion of input array 400 includes data entries 402-($c_v$+1)-402-N in input array 400. Moreover, the second portion of input array 400 includes indices i∈{$c_v$-N-1} of input array 400. It should be appreciated that the number of remaining data entries 402 included in input array 400 is also equal to the number of invalid data entries 402 included in input array 400. Therefore, the second portion of input array 400 includes as many data entries 402 as there are invalid data entries 402 included in input array 400. In addition, the number of invalid data entries 402 included in the first portion of input array 400 is equal to the number of valid data entries 402 included in the second portion of input array 400. As described herein, input array 400 includes 14 invalid data entries 402. Accordingly, in the non-limiting illustrated example of FIG. 7, the second portion of input array 400 is shown to include the last 14 data entries 402-32-402-45 included in input array 400.

In addition, when implementing the second pass of compaction process 600, compaction application 340 determines the number of invalid data entries 402 included in the first portion of input array 400 based on the respective values of the Boolean flags $t_v$ included in the first $c_v$ data entries 502-1-502-$c_v$ in buffer array 500. For example, without limitation, to determine the number of invalid data entries 402 included in the first portion of input array 400, compaction application 340 uses the second counter $c_i$ to count the number of false Boolean flags $t_v$ included in the first $c_v$ data entries 502-1-502-$c_v$ in buffer array 500.

Furthermore, when implementing the second pass of compaction process 600, compaction application 340 replaces the contents of the first $c_i$ data entries 502-1-502-$c_i$ included in buffer array 500 with the contents of the data entries 502 that are included in the first $c_v$ data entries 502-1-502-$c_v$ and that include false Boolean flags $t_v$. That is, compaction application 340 replaces the contents of the first $c_i$ data entries 502-1-502-$c_i$ included in buffer array 500 with the contents of the data entries 502 included in the first $c_v$ data entries 502-1-502-$c_v$ included in buffer array 500 that correspond to the invalid data entries 402 included in the first portion of input array 400. Replacing the contents of a first data element 502 with the contents of a second data element 502 includes replacing the unsigned integer of the first data element 502, which includes an integer index $t_i$ and a Boolean flag $t_v$, with the unsigned integer of the second data element 502, which includes a different integer index $t_i$ and a Boolean flag $t_v$.

As described herein, the value of $c_i$ is equal to the number of invalid data entries 402 included in the first portion of input array 400. Thus, by the end of the second pass of compaction process 600, the first $c_i$ data entries 502-1-502-$c_i$ included in buffer array 500 contain a compact set of the indices of the invalid data entries 402 included in the first portion of input array 400. That is, the integer indices $t_i$ included in the first a data entries 502-1-502-$c_i$ in buffer array 500 correspond to the indices i of the invalid data entries 402 included in the first portion of input array 400. With respect to the non-limiting illustrated example of FIG. 7, the number $c_i$ of invalid data entries 402 included in the first portion of input array 400 is equal to ten. Accordingly, as shown in FIG. 7, the first ten data entries 502-1-502-10 include a compact set of integer indices $t_i$ that correspond to the indices i of the ten invalid data entries 402 included in the first portion of input array 400.

In one non-limiting example implementation of the second pass of compaction process 600, compaction application 340 evaluates the values of the Boolean flag $t_v$ included in the data entries 502 positioned at indices i∈{0-$c_v$-1} in buffer array 500. That is, compaction application 340 evaluates the Boolean flag $t_v$ of each data element 502-1-502-$c_v$ in buffer array 500. When the Boolean flag $t_v$ of a data element 502 positioned at index i is false, or 0, compaction application 340 copies the contents of the data element 502 at index i in buffer array 500 into the data element 502 positioned at index i=$c_i$. That is, compaction application 340 replaces the contents of the data element 502 positioned at index i=$c_i$ in buffer array 500 with the contents of the data element 502 positioned at index i in buffer array 500. After copying the contents of the data element 502 at index i in buffer array 500 into the data element 502 positioned at index i=$c_i$, compaction application 340 increments the second counter $c_i$ by one. When the Boolean flag $t_v$ of a data element 502 positioned at index i is true, or 1, compaction application 340 does not copy the contents of the data element 502 at index i in buffer array 500 into the data element 502 positioned at index i=$c_i$. Furthermore, when the Boolean flag $t_v$ of a data element 502 positioned at index i is true, or 1, compaction application 340 does not increment the second counter $c_i$ by one.

With reference to the non-limiting example of FIG. 6, which illustrates the state of buffer array 500 at the beginning of the second pass of compaction process 600, when implementing the non-limiting example implementation of the second pass of compaction process 600, compaction application 340 determines that the Boolean flag $t_v$ of the data element 502 positioned at index i=0 (e.g., data element 502-1) in buffer array 500 is true, or 1. Thus, compaction application 340 does not replace the contents of the data element 502 positioned at index i=$c_i$ (e.g., data element 502-1) in buffer array 500 with the contents of the data element 502 positioned at index i=0 (e.g., data element 502-1) in buffer array 500. Furthermore, compaction application 340 does not increment the second counter $c_i$ by one. Thus, the second counter $c_i$ is still zero.

With further reference to the non-limiting example of FIG. 6, when implementing the non-limiting example implementation of the second pass of compaction process 600, compaction application 340 determines that the Boolean flag $t_v$ of the data element 502 positioned at index i=1 (e.g., data element 502-2) in buffer array 500 is false, or 0. Thus, compaction application 340 replaces the contents of the data element 502 positioned at index i=$c_i$ (e.g., data element 502-1) in buffer array 500 with the contents of the data element 502 positioned at index i=1 (e.g., data element 502-2) in buffer array 500. In addition, compaction application 340 increments the second counter $c_i$ by one such that the value of the second counter $c_i$ is now one.

As described herein and shown in the non-limiting example of FIG. 7, by the end of the non-limiting example implementation of the second pass of compaction process 600, the first $c_i$ data entries 502-1-502-$c_i$ included in buffer array 500 contain a compact set of the indices of the invalid data entries 402 included in the first portion of input array 400. That is, the integer indices $t_i$ included in the first $c_i$ data entries 502-1-502-$c_i$ in buffer array 500 correspond to the indices i of the invalid data entries 402 included in the first portion of input array 400. In addition, by the end of the non-limiting example implementation of the second pass of compaction process 600, the value of the second counter $c_i$ is equal to the number of invalid entries included in the first portion of input array 400.

In some non-limiting examples, compaction application 340 may execute the second pass of compaction process 600 in parallel. In such non-limiting examples, compaction application 340 may use a single atomic addition operation to execute the second pass of compaction process 600. That is, compaction application 340 atomically replaces the contents of first $c_i$ data entries 502-1-502-$c_i$ in buffer array 500 with the contents of the data entries 502 included in the first $c_v$ data entries 502-1-502-$c_v$ that include false Boolean flags $t_v$. When compared to sequential execution, parallel execution of the second pass of compaction process 600 is lock-free and requires less computing time.

Figure 8:
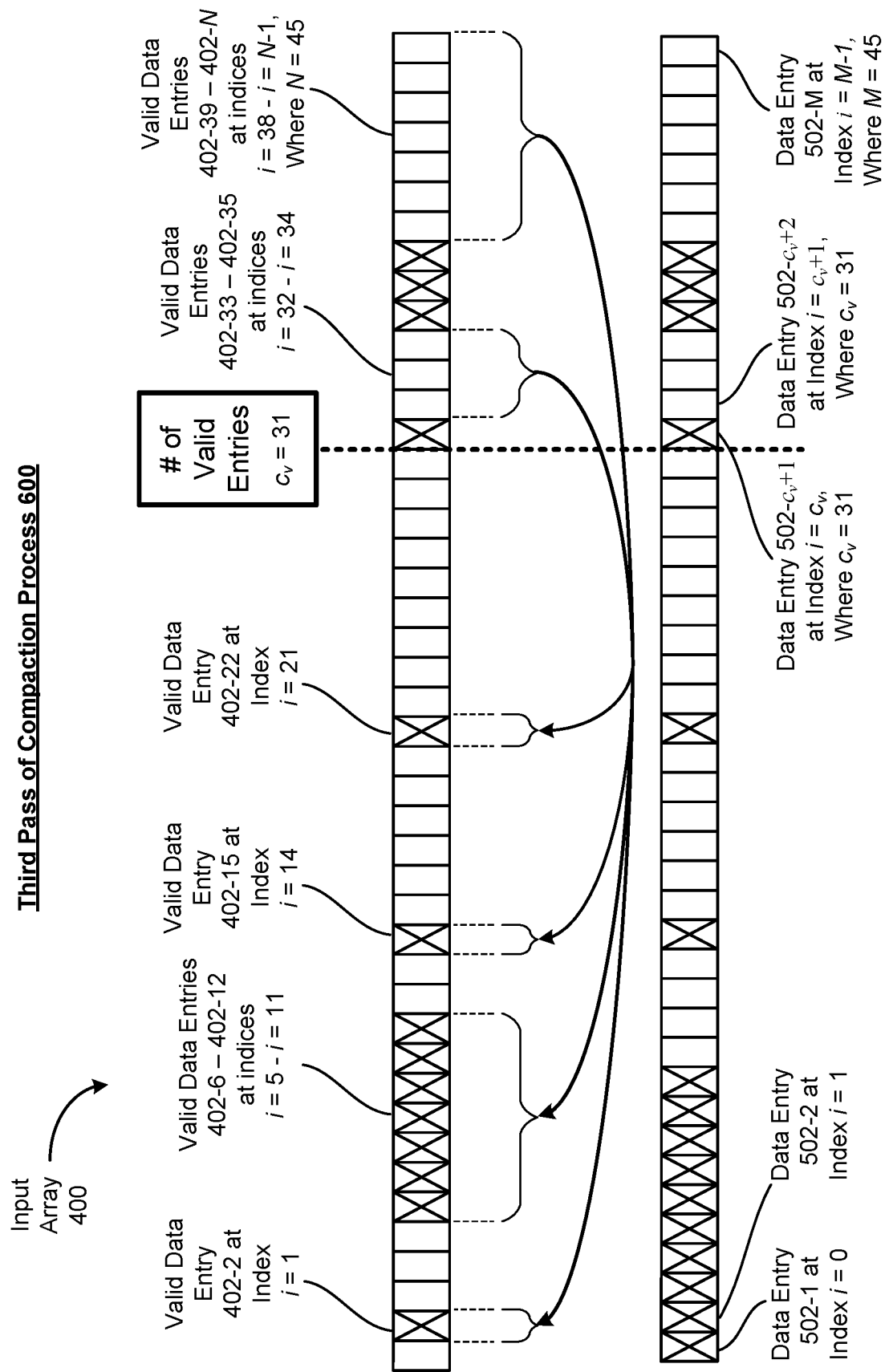
FIG. 8 illustrates an example third pass of a compaction process, according to various embodiments.

After completing the second pass of compaction process 600, compaction application 340 implements the third pass of compaction process 600. FIG. 8 illustrates a non-limiting example of a third pass of compaction process 600, according to various embodiments. As shown in FIG. 8, when implementing the third pass of compaction process 600, compaction application 340 replaces the contents of the invalid data entries 402 included in the first portion of input array 400 with the contents of the valid data entries 402 included in the second portion of input array 400. When replacing the contents of the invalid data entries 402 included in the first portion of input array 400 with the contents of the valid data entries 402 included in the second portion of input array 400, compaction application 340 determines the indices i of the second portion of input array 400 that include valid data entries 402 based on the values of the integer indices $t_i$ and the Boolean flags $t_v$ included in the data entries 502 in buffer array 500. Similarly, compaction application 340 determines the indices i of the first portion of input array 400 that include invalid data entries 402 based on the values of the integer indices $t_i$ and the Boolean flags $t_v$ included in the data entries 502 in buffer array 500. With respect to the non-limiting illustrated example of FIG. 8, compaction application 340 replaces the contents of the invalid data entries 402-2, 402-6-402-12, 402-15, and 402-22 included in the first portion of input array 400 with the contents of the valid data entries 402-33-402-35 and 402-39-402-45 included in the second portion of input array 400.

Figure 9:
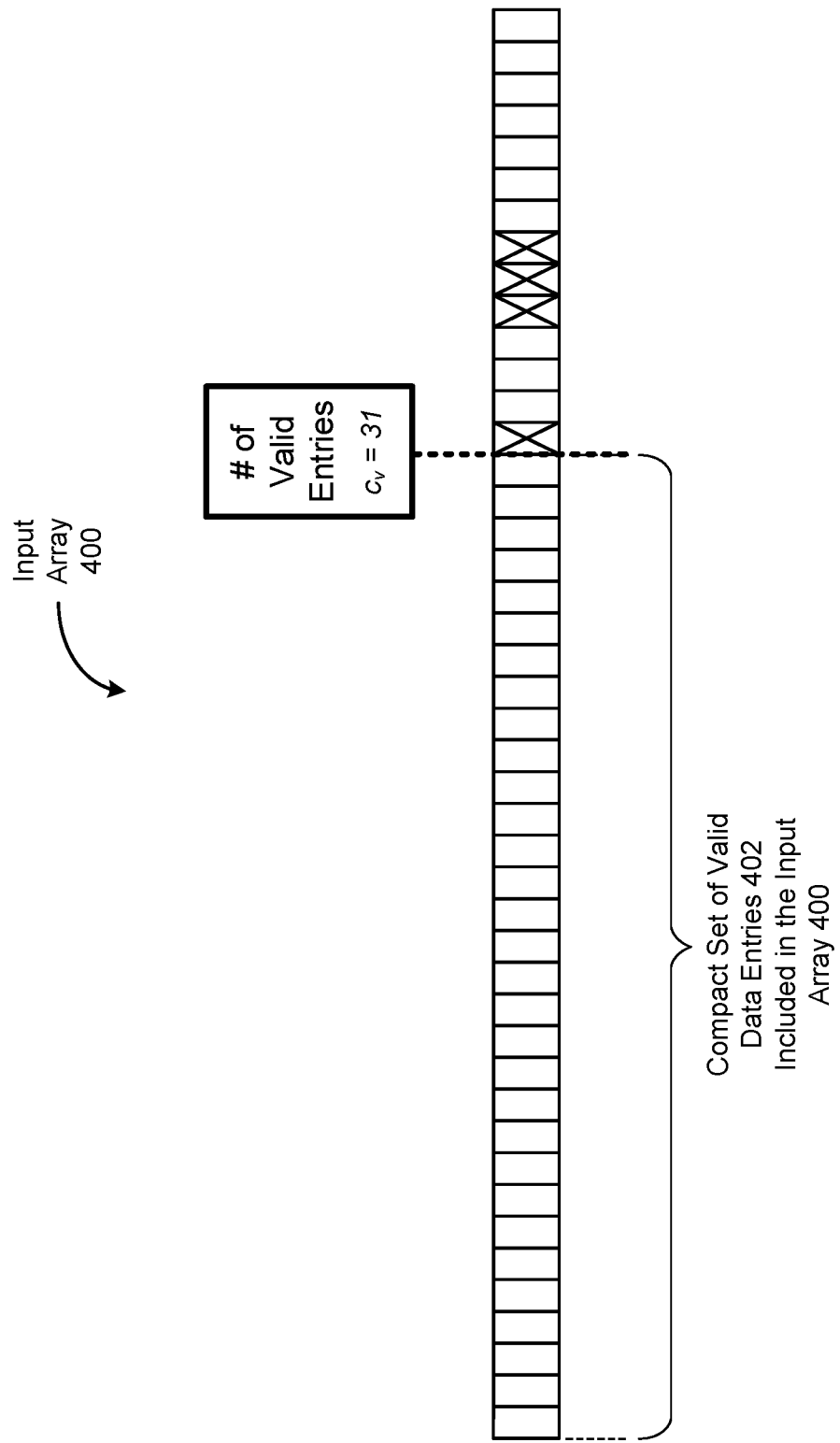
FIG. 9 illustrates an example result of the third pass of the compaction process of FIG. 8, according to various embodiments.

By the end of the third pass of compaction process 600, the first portion of input array 400 is a compact set of the valid data entries 402 included in input array 400. FIG. 9 illustrates a non-limiting example result of the first pass of compaction process 600, according to various embodiments.

In some embodiments, at the end of the third pass of compaction process 600, compaction application 340 further removes, or deletes, the second portion of input array 400 from input array 400. Accordingly, in such embodiments, the resultant array is a compact array of $c_v$ data entries 402 that contains only the valid data entries 402 of input array 400. This compact array of $c_v$ data entries 402 that contains only the valid data entries 402 of input array 400 includes fewer data entries than the N data entries 402 of input array 400.

In one non-limiting example implementation of the third pass of compaction process 600, compaction application 340 evaluates the validity of the data entries 402 positioned at indices i ∈ $\{c_v$–N–1$\}$ included in the second portion of input array 400. For example, without limitation, compaction application 340 evaluates the validity of these data entries 402 by determining the values of the Boolean flags $t_v$ included in the data entries 502 positioned at indices i ∈ $\{c_v$–M–1$\}$ in buffer array 500. That is, compaction application 340 evaluates the Boolean flag $t_v$ of each data element 502-$c_v$+1-502-M in buffer array 500. When the Boolean flag $t_v$ of a particular data element 502 positioned at index i in buffer array 500 is true, or 1, the corresponding data element 402 positioned at index i in input array 400 is valid. Likewise, when the Boolean flag $t_v$ of a particular data element 502 positioned at index i in buffer array 500 is false, or 0, the corresponding data element 402 positioned at index i in input array 400 is invalid.

Accordingly, in this non-limiting example implementation of the third pass of compaction process 600, when the Boolean flag $t_v$ of a particular data element 502 positioned at index i in buffer array 500 is true, or 1, compaction application 340 fetches the integer index $t_i$ included the data element 502 positioned at index i=c in buffer array 500. As described herein, the value of the third counter c was initialized to zero before beginning compaction process 600. Compaction application 340 then replaces the contents of the data element 402 positioned at the index i=$t_i$ in input array 400 with the contents of the data element 402 positioned at the current index i in the second portion of input array 400. In addition, compaction application 340 increments the third counter c by one when the Boolean flag $t_v$ of a particular data element 502 positioned at index i is true.

When the Boolean flag $t_v$ of a particular data element 502 positioned at index i in buffer array 500 is false, or 0, compaction application 340 does not fetch the integer index $t_i$ included the data element 502 positioned at index i=c in buffer array 500. Moreover, compaction application 340 does not replace the contents of the data element 402, which is positioned in input array 400 at the index i=the integer index $t_i$ included the data element 502 positioned at index i=c in buffer array 500, with the contents of the data element 402 positioned at the current index i in the second portion of input array 400. Furthermore, compaction application 340 does not increment the third counter c.

With reference to the non-limiting example of FIG. 8, when implementing the non-limiting example implementation of the third pass of compaction process 600, compaction application 340 determines that the Boolean flag $t_v$ of the data element 502 positioned at index i=$c_v$ (e.g., data element 502-32) is false, or 0. Thus, compaction application 340 does not fetch the integer index $t_i$ included the data element 502 positioned at index i=c in buffer array 500 (e.g., data element 502-1). Moreover, compaction application 340 does not replace the contents of the data element 402-1, which is positioned in input array 400 at the index i=the integer index $t_i$ included the data element 502 positioned at index i=c in buffer array 500, with the contents of the data element 402 positioned at the current index i in the second portion of input array 400 (e.g., data element 402-32). In addition, compaction application 340 does not increment the third counter c.

With further reference to the non-limiting example of FIG. 8, when implementing the non-limiting example implementation of the third pass of compaction process 600, compaction application 340 determines that the Boolean flag $t_v$ of the data element 502 positioned at index $i=c_v+1$ (e.g., data element 502-33) is true, or 1. Thus, compaction application 340 fetches the integer index $t_i$ included the data element 502 positioned at index i=c in buffer array 500 (e.g., data element 502-1). Compaction application 340 then replaces the contents of the data element 402 positioned at the index $i=t_i$ in input array 400 (e.g., data element 402-2) with the contents of the data element 402 positioned at the current index $i=c_v+1$ in the second portion of input array 400 (e.g., data element 402-33). In addition, compaction application 340 increments the third counter c by one.

As described herein and shown in FIG. 9, by the end of the non-limiting example implementation of the third pass of compaction process 600, the first portion of input array 400 is a compact set of the valid data entries 402 included in input array 400. In some embodiments, at the end of the non-limiting example implementation of the third pass of compaction process 600, compaction application 340 further removes, or deletes, the second portion of input array 400 from input array 400. Accordingly, in such embodiments, the resultant array is a compact array of $c_v$ data entries 402 that contains only the valid data entries 402 in input array 400 at the end of compaction process 600. This compact array of $c_v$ data entries 402 that contains only the valid data entries 402 in input array 400 has fewer data entries than the N data entries 402 in input array 400.

In some non-limiting examples, compaction application 340 may execute the third pass of compaction process 600 in parallel. In such non-limiting examples, compaction application 340 may atomically update the counters, such as the first counter $c_v$. When compared to sequential execution, parallel execution of the third pass of compaction process 600 is lock-free and requires less computing time.

Compaction process 600 is described herein with respect to embodiments in which the number M of data entries 502-1-502-M included in buffer array 500 is equal to the number N of data entries 402-1-402-N included in input array 400. However, as described herein, in some embodiments, compaction application 340 generates a buffer array 500 that includes less data entries than input array 400. That is, in some embodiments, the number M of data entries 502-1-502-M included in buffer array 500 is less than the number N of data entries 402-1-402-N included in input array 400. Accordingly, for embodiments in which the buffer array 500 includes less data entries than input array 400, compaction application 340 implements a modified compaction process, such as a modified version of compaction process 600, to compact input array 400.

Similar to compaction process 600 described herein, before implementing the modified compaction process, compaction application 340 initializes the values of various unsigned integer counters $c_v$, $c_i$, and c to zero. As described herein, compaction application 340 uses the first counter $c_v$ to count a number of valid data entries included in an input array and uses the second and third counters $c_i$, c for task tracking. When implementing the modified compaction process, compaction application 340 further uses a fourth counter $i_{next}$ and a fifth counter $v_{next}$ for task tracking. Before implementing the modified compaction process, compaction application 340 initializes the value of the fourth counter $i_{next}$ to zero. In addition, compaction application 340 may optionally initialize the value of the fifth counter $v_{next}$ to zero. However, initializing the value of the fifth counter $v_{next}$ to zero is not necessary.

In one non-limiting example implementation of the modified compaction process implemented by compaction application 340, compaction application 340 implements a first pass that is a modified, combined version of the first and second passes included in compaction process 600 described herein. Hereinafter, the first pass that is a modified, combined version of the first and second passes included in compaction process 600 may be referred to as the "modified first pass."

When implementing the modified first pass of the modified compaction process, compaction application 340 evaluates the validity of the data entries 402 positioned at indices $i \in \{i_{next}-N-1\}$ in input array 400. For example, without limitation, compaction application 340 executes the isValid (i) function on the data entries 402 positioned at indices $i \in \{i_{next}-N-1\}$ in input array 400 to determine the respective validities of the data entries 402 positioned at indices $i \in \{i_{next}-N-1\}$ in input array 400. As described herein, the value of $i_{next}$ is zero at the beginning of the modified compaction process. Thus, compaction application 340 evaluates the validity of each data element 402 included in input array 400. When compaction application 340 determines that the data element 402 positioned at an index i in input array 400 is valid, compaction application 340 increments the first counter $c_v$ by one. That is, when compaction application 340 determines that the result of the isValid(i) function executed on a data element 402 positioned at an index i in input array 400 is true, or 1, compaction application 340 increments the first counter $c_v$ by one.

When compaction application 340 determines that the data element 402 positioned at an index i in input array 400 is invalid, compaction application 340 determines whether the value of the second counter $c_i$ is less than M. That is, when compaction application 340 determines that the result of the isValid(i) function executed on a data element 402 positioned at an index i in input array 400 is false, or 0, compaction application 340 determines whether the value of the second counter $c_i$ is less than M. When compaction application 340 determines that the data element 402 positioned at an index i in input array 400 is invalid and the value of the second counter $c_i$ is less than M, compaction application 340 fetches the data element 502 that is positioned at index $i=ci$ in buffer array 500.

Compaction application 340 then sets the value of the integer index $t_i$ included in the data element 502 that is positioned at index $i=c_i$ in buffer array 500 to $c_i$ and increments the second counter $c_i$ by one. That is, when compaction application 340 determines that the result of the is Valid(i) function executed on a data element 402 positioned at an index i in input array 400 is false, or 0, and the value of the second counter $c_i$ is less than M, compaction application 340 sets the value of the integer index $t_i$ included in the data element 502 that is positioned at index $i=c_i$ in buffer array 500 to $c_i$ and increments the second counter $c_i$ by one. At the end of the modified first pass, compaction application 340 sets the value of the fourth counter $i_{next}$ to be the value of the second counter $c_i$ and then resets the value of the second counter $c_i$ to zero.

By the end of the modified first pass of the modified compaction process, the first a data entries 502-1-502-$c_i$ included in buffer array 500 contain a compact set of the indices i of the first M or fewer invalid data entries 402 included in input array 400. That is, the integer indices $t_i$ included in the first a data entries 502-1-502-$c_i$ in buffer array 500 correspond to the indices i of the invalid data entries 402 included in a first portion of input array 400 that includes M or fewer invalid data entries 402. In addition, by the end of the modified first pass of the modified compaction process, the value of the first counter $c_v$ is equal to the number of valid entries 402 included in input array 400.

In some non-limiting examples, compaction application 340 may execute the modified first pass of the modified compaction process in parallel. In such non-limiting examples, compaction application 340 may use a single atomic addition operation to execute the modified first pass of the modified compaction process. That is, compaction application 340 may atomically update the counter values, such as the first counter $c_v$. When compared to sequential execution, parallel execution of the modified first pass of the modified compaction process is lock-free and requires less computing time.

After completing the modified first pass of the modified compaction process, compaction application 340 implements a modified second pass of the modified compaction process. In one non-limiting example implementation of the modified compaction process, the modified second pass is a modified version of the third pass of compaction process 600 described herein. Before implementing a first iteration of the modified second pass of the of modified compaction process, compaction application 340 sets the value of the fifth counter $v_{next}$ to be the value of the first counter $c_v$. As described herein, the value of the first counter $c_v$ is currently equal to the number of valid data entries 402 included in input array 400. Accordingly, at the beginning of a first implementation modified second pass, the value of the fifth counter $v_{next}$ is equal to the number of valid data entries 402 included in input array 400. Compaction application 340 does not reset the value of the fifth counter $v_{next}$ to be the value of the first counter $c_v$ before implementing subsequent iterations of the modified second pass.

When implementing the modified second pass of the modified compaction process, compaction application 340 evaluates the validity of the data entries 402 positioned at indices $i \in \{v_{next}-N-1\}$ of input array 400. For example, without limitation, compaction application 340 executes the isValid(i) function on the data entries 402 positioned at indices $i \in \{v_{next}-N-1\}$ in input array 400 to determine the respective validities of the data entries 402 positioned at indices $i \in \{v_{next}-N-1\}$ in input array 400. When compaction application 340 determines that the data element 402 positioned at an index i in input array 400 is valid, compaction application 340 fetches the integer index $t_i$ stored in the data element 502 that is positioned at index i=c in buffer array 500. As described herein, the value of the third counter c was initialized to zero at the beginning of the modified compaction process. Compaction application 340 then replaces the contents of the data element 402 positioned at the index i=$t_i$ in input array 400 with the contents of the data element 402 positioned at the current index i in input array 400. In addition, compaction application 340 increments the third counter c by one.

If compaction application 340 determines that the value of the third counter c is equal to M when implementing the modified second pass of the modified compaction process, compaction application 340 sets the value of the fifth counter $v_{next}$ to c, sets the value of the third counter c to zero, and stops implementing the modified second pass of the compaction process. The compaction process 340 then repeats the modified compaction process until the value of the first counter $c_v$ equals N when implementing the modified second pass of the modified compaction process. When the value of the first counter $c_v$ equals N, compaction application 340 ends the modified compaction process and compaction of input array 400 is complete.

Similar to compaction process 600 described herein, when the modified compaction process is complete, a first portion of input array 400 includes a compact set of the valid data entries 402 included in input array 400. In some embodiments, at the end of the modified compaction process, compaction application 340 further removes, or deletes, the remaining data entries 402 included in input array 400. Accordingly, in such embodiments, the resultant array is a compact array of $c_v$ data entries 402 that contains only the valid data entries 402 in input array 400. This compact array of $c_v$ data entries 402 that contains only the valid data entries 402 in input array 400 includes fewer data entries than the N data entries 402 in input array 400.

In some non-limiting examples, compaction application 340 may execute the modified second pass of the modified compaction process in parallel. In such non-limiting examples, compaction application 340 may atomically update the counters, such as the first counter $c_v$. When compared to sequential execution, parallel execution of the modified second pass of the modified compaction process is lock-free and requires less computing time.

Figure 10:
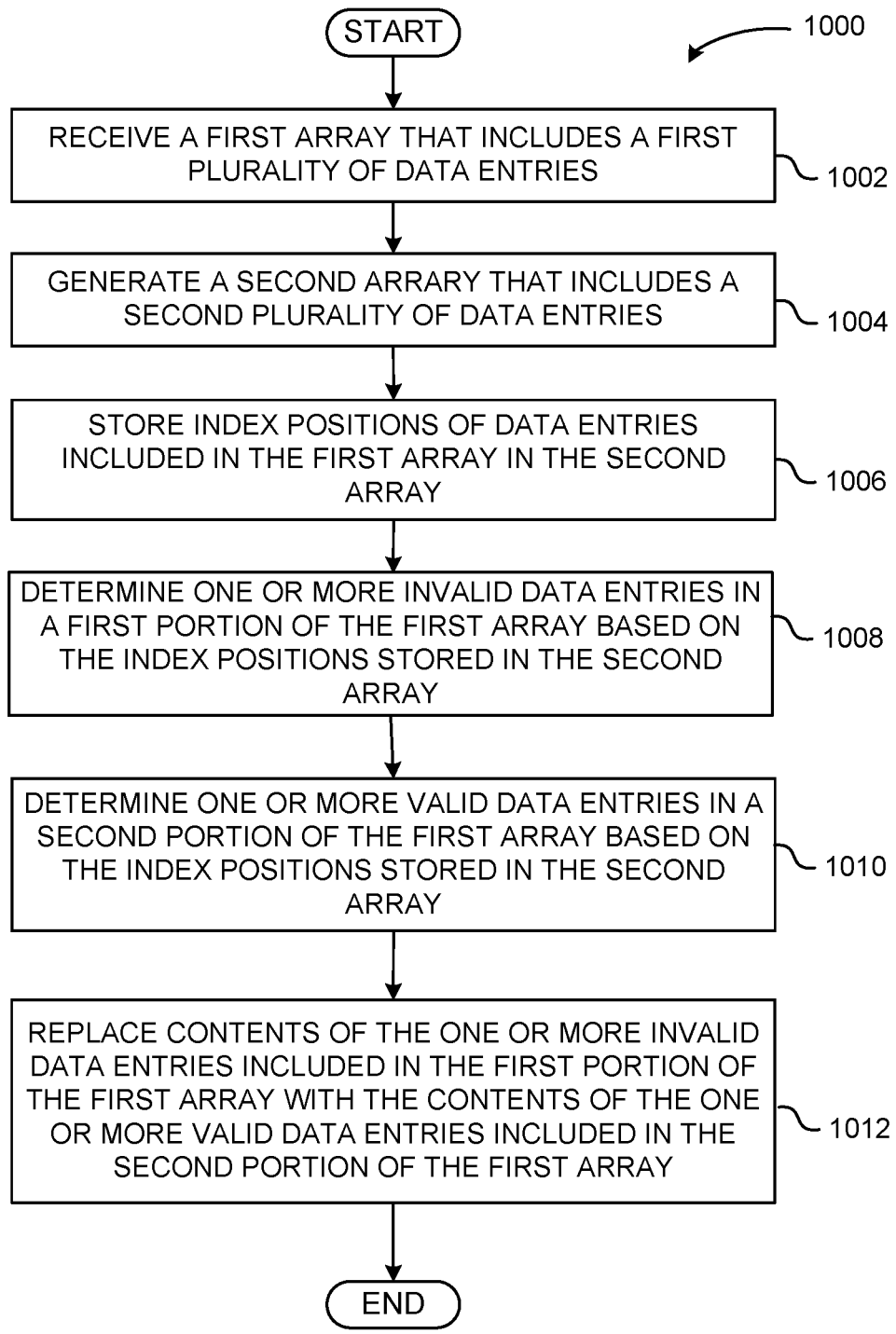
FIG. 10 is a flow diagram of method steps for compacting a sparse array, according to various embodiments.

FIG. 10 is a flow diagram of method steps for compacting a sparse array, according to various embodiments. The method operations can be performed by CPU 102, accelerator processing subsystem 112, and/or the like. Additionally or alternatively, the method operations can be performed by one or more processing units and/or alternative accelerators including, without limitation, CPUs, GPUs, DMA units, IPUs, NPUs, TPUs, NNPs, DPUs, VPUs, ASICs, FPGAs, and/or the like, in any combination. Furthermore, one or more of the method operations can be performed atomically by multiple processing units executing in parallel. Although the method operations are described in conjunction with the systems of FIGS. 1-9, persons of ordinary skill in the art will understand that any system configured to perform the method operations, in any order, is within the scope of the present disclosure.

As shown, a method 1000 begins at operation 1002, where one or more processing units, such as one or more CPUs 102 or one or more PPUs 202, receive a first array that includes a first plurality of data entries. For example, without limitation, the first array is an input array 400 that is received by a compaction application 340, executing on the one or more processing units, and includes N data entries 402-1-402-N.

At operation 1004, the one or more processing units generate a second array that includes a second plurality of data entries. For example, without limitation, the second array is a buffer array 500 that is generated by a compaction application 340, executing on the one or more processing units, and includes M data entries 502-1-502-M. As described herein, the number M of data entries 502 included in buffer array 500 may be equal to or less than the number N of data entries 402 included in input array 400.

At operation 1006, the one or more processing units store, in the second array, respective index positions of the valid data entries included in the first array and the invalid data entries included in the first array. For example, without limitation, the compaction application 340 stores integer indices $t_i$ that represent the indices i of valid data entries 402 included in input array 400 in respective data entries 502 in buffer array 500. As another non-limiting example, a compaction application 340 stores integer indices $t_i$ that represent the indices i of invalid data entries 402 included in input array 400 in respective data entries 502 in buffer array 500. In some non-limiting examples, operation 1006 is executed in parallel on multiple processing units.

At operation 1008, the one or more processing units determine, based at least on the index positions stored in the second array, one or more data entries included in a first portion of the first array that are invalid. For example, without limitation, the compaction application 340 determines one or more data entries 402 positioned in a first portion of input array 400 are invalid based on the integer indices $t_i$ and Boolean flags $t_v$ that are stored in the data entries 502 in buffer array 500. As described herein, in some non-limiting examples, the first portion of input array 400 includes a number of data entries that corresponds to a number of valid data entries included in input array 400. In some non-limiting examples, operation 1008 is executed in parallel on multiple processing units. In such non-limiting examples, compaction application 340 executing on the multiple processing units may determine the one or more invalid data entries 402 positioned in the first portion of input array 400 using a single atomic addition operation.

At operation 1010, the one or more processing units determine, based at least on the index positions stored in the second array, one or more data entries included in a second portion of the first array that are valid. For example, without limitation, a compaction application 340 determines one or more data entries 402 positioned in a second portion of input array 400 are valid based on the integer indices $t_i$ and Boolean flags $t_v$ that are stored in the data entries 502 in buffer array 500. As described herein, in some non-limiting examples, the second portion of input array 400 includes a number of data entries that corresponds to a number of invalid data entries included in input array 400. In some non-limiting examples, operation 1010 is executed in parallel on multiple processing units.

At operation 1012, the one or more processing units replace the contents of the one or more invalid data entries included in the first portion of the first array with the contents of the one or more valid data entries included in the second portion of the first array. For example, without limitation, a compaction application 340 replaces the contents of the one or more invalid data entries 402 included in the first portion of input array 400 with the contents of the one or more valid data entries 402 included in the second portion of input array 400. In some non-limiting examples, operation 1012 is executed in parallel on multiple processing units. Method 1000 then terminates.

In the manner described above, the method 1000 modifies a sparsely populated input array such that, once the method 1000 terminates, the input array is compacted and consumes much less space than prior to the compaction process. Various downstream applications and components that would otherwise be operating on large sparse input arrays benefit from the disclosed techniques that enable those input arrays to be compacted and have a smaller memory footprint. For example, a mesh topology application that generates a mesh topology based on input arrays of geometric primitive information can utilize the compaction techniques disclosed herein to generate a compacted input array. The compacted input array enables the mesh topology application to execute more efficiently and with a smaller memory footprint relative to the application operating on a sparsely populated input array.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

In sum, various embodiments include techniques for using an in-place, non-order-preserving, and lock-free process for compacting an input array, such as a large sparse array. With the disclosed techniques, an input array is compacted in multiple passes with the use of a buffer array, where at least one pass is suitable for execution on a processing unit with multiple parallel processors, such as a GPU. The buffer array consumes much less space in memory than the input array. Each data element in the buffer array may include a single bit flag and an unsigned integer index. The single bit flag indicates whether a respective data element in the input array is valid, or non-zero, and the unsigned integer index indicates the index of that respective data element in the input array. In a first pass, a processing unit counts the number of valid data entries in the input array and sets a corresponding flag in the buffer array to true for each valid data element in input array. In a second pass, the processing unit determines, based at least on the single bit flags and the unsigned integer indices included in the data entries in buffer array, the indices of invalid data entries included in a first portion of the input array. The number of data entries included in the first portion of the input array may correspond to the number of valid data entries included in the input array. In a third pass, the processing unit determines, based on the single bit flags and an unsigned integer indices included in the data entries in buffer array, the indices of valid data entries included in a second portion of the input array. The processing unit then replaces the contents of the invalid data entries included in the first portion of the input array with the contents of the valid data entries included in the second portion of the input array. Thus, at the end of the third pass, the input array contains a compact set of the valid data entries included in the input array.

At least one technical advantage of the disclosed techniques relative to the prior art is that, with the disclosed techniques, a processor can perform one or more steps of a compaction process in parallel, thereby taking advantage of the processing capabilities of accelerator processing subsystems that include multiple parallel processing units. The disclosed techniques can thereby result in significant reduction of the processing time needed to compact an input array, such as a large sparse array. At least another technical advantage of the disclosed techniques relative to the prior art is that, with the disclosed techniques, an input array can be compacted without preserving the order of the data entries included in the input array. As a result, a buffer array that consumes much less space in memory than the array can be used to store the index positions of the data entries included in the input array during the compaction process. This decreased size of the buffer array relative to the input array significantly reduces the amount of memory that is needed for compacting the input array and/or storing the buffer array during compaction of the input array. These advantages represent one or more technological improvements over prior art approaches.

1. In some embodiments, a method comprises receiving a first array that includes a first plurality of data entries; generating a second array that includes a second plurality of data entries; storing, in the second array, respective index positions of valid data entries included in the first array and invalid data entries included in the first array; determining, based at least on the index positions stored in the second array, one or more invalid data entries included in a first portion of the first array; determining, based at least on the index positions stored in the second array, one or more valid data entries included in a second portion of the first array; and replacing contents of the one or more invalid data entries included in the first portion of the first array with contents of the one or more valid data entries included in the second portion of the first array.

2. The method of clause 1, wherein a number of data entries included in the first plurality of data entries is equal to a number of data entries included in the second plurality of data entries.

3. The method of clauses 1 or 2, wherein each data element included in the second plurality of data entries includes an integer index and a flag that corresponds to the validity of a data element in the first array positioned at an index indicated by the integer index.

4. The method of any of clauses 1-3, wherein storing, in the second array, a respective index position of a valid data element included in the first array includes setting a value of a corresponding flag included in the second array to true and incrementing a valid counter; and wherein storing, in the second array, a respective index position of an invalid data element included in the first array includes setting a value of a corresponding flag included in the second array to false.

5. The method of any of clauses 1-4, wherein determining, based at least on the index positions stored in the second array, one or more invalid data entries included in the first portion of the first array includes storing the respective index positions of the one or more invalid data entries included in the first portion of the first array in a first N data entries of the second array, wherein N is equal to a number of invalid data entries included in the first portion of the first array.

6. The method of any of clauses 1-5, wherein the second array consumes less space in memory than the first array.

7. The method of any of clauses 1-6, wherein a number of data entries included in the first portion of the first array corresponds to a number of valid data entries included in the first array.

8. The method of any of clauses 1-7, wherein a number of invalid data entries included in the first portion of the first array equals a number of valid data entries included in the second portion of the first array.

9. The method of any of clauses 1-8, wherein an invalid data element is a data element having a value of zero and a valid data element is a data element having a non-zero value.

10. The method of any of clauses 1-9, wherein a number of data entries included in the second plurality of data entries is less than a number of data entries included in the first plurality of data entries.

11. The method of any of clauses 1-10, wherein determining, based at least on the index positions stored in the second array, one or more invalid data entries included in the first portion of the first array is performed at least partially in parallel by multiple processing units.

12. The method of any of clauses 1-11, wherein determining, based at least on the index positions stored in the second array, one or more valid data entries included in the second portion of the first array is performed at least partially in parallel by multiple processing units.

13. The method of any of clauses 1-12, wherein replacing the contents of the one or more invalid data entries included in the first portion of the first array with the contents of the one or more valid data entries included in the second portion of the first array is performed at least partially in parallel by multiple processing units.

14. In some embodiments, a processor comprises one or more circuits to receive a first array that includes a first plurality of data entries; generate a second array that includes a second plurality of data entries; store, in the second array, respective index positions of valid data entries included in the first array and invalid data entries included in the first array; determine, based at least on the index positions stored in the second array, one or more invalid data entries included in a first portion of the first array; determine, based at least on the index positions stored in the second array, one or more valid data entries included in a second portion of the first array; and replace contents of the one or more invalid data entries included in the first portion of the first array with contents of the one or more valid data entries included in the second portion of the first array.

15. The processor of clause 14, wherein a number of data entries included in the first plurality of data entries is equal to a number of data entries included in the second plurality of data entries.

16. The processor of clauses 14 or 15, wherein the second array consumes less space in memory than the first array.

17. The processor of any of clauses 14-16, wherein storing, in the second array, a respective index position of a valid data element included in the first array includes setting a value of a corresponding flag stored in the second array to true and incrementing a valid counter.

18. The processor of any of clauses 14-17, wherein the processor is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system for generating synthetic data; a system incorporating one or more virtual machines (VMs); a system implemented at least partially in a data center; or a system implemented at least partially using cloud computing resources.

19. In some embodiments, a system comprises one or more processing units; and one or more memory units storing instructions that, when executed by the one or more processing units, cause the one or more processing units to execute operations comprising receiving a first array that includes a first plurality of data entries; generating a second array that includes a second plurality of data entries; storing, in the second array, respective index positions of valid data entries included in the first array and invalid data entries included in the first array; determining, based at least on the index positions stored in the second array, one or more invalid data entries included in a first portion of the first array; determining, based at least on the index positions stored in the second array, one or more valid data entries included in a second portion of the first array; and replacing contents of the one or more invalid data entries included in the first portion of the first array with contents of the one or more valid data entries included in the second portion of the first array.

20. The system of clause 19, wherein the system is comprised in at least one of a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system for generating synthetic data; a system incorporating one or more virtual machines (VMs); a system implemented at least partially in a data center; or a system implemented at least partially using cloud computing resources.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and/or variations will be apparent to those of ordinary skill in the art without departing from the scope and/or spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and/or hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described herein with reference to flowchart illustrations and/or block diagrams of methods, apparatus (systems) and/or computer program products according to embodiments of the disclosure. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and/or block diagrams in the figures illustrate the architecture, functionality, and/or operation of possible implementations of systems, methods, and/or computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that perform the specified functions or acts, or combinations of special purpose hardware and/or computer instructions.

While the preceding is directed to embodiments of the present disclosure, other and/or further embodiments of the disclosure may be devised without departing from the basic scope thereof, and/or the scope thereof is determined by the claims that follow.

What is claimed is:

1. A method, comprising:
receiving a first array that includes a first plurality of data entries;
generating a second array that includes a second plurality of data entries;
storing, in the second array, respective index positions of valid data entries included in the first array and invalid data entries included in the first array;
determining, based at least on the index positions stored in the second array, one or more invalid data entries included in a first portion of the first array;
determining, based at least on the index positions stored in the second array, one or more valid data entries included in a second portion of the first array; and
replacing contents of the one or more invalid data entries included in the first portion of the first array with contents of the one or more valid data entries included in the second portion of the first array.

2. The method of claim 1, wherein a number of data entries included in the first plurality of data entries is equal to a number of data entries included in the second plurality of data entries.

3. The method of claim 1, wherein each data element included in the second plurality of data entries includes an integer index and a flag that corresponds to the validity of a data element in the first array positioned at an index indicated by the integer index.

4. The method of claim 1, wherein storing, in the second array, a respective index position of a valid data element included in the first array includes setting a value of a corresponding flag included in the second array to true and incrementing a valid counter; and
wherein storing, in the second array, a respective index position of an invalid data element included in the first array includes setting a value of a corresponding flag included in the second array to false.

5. The method of claim 1, wherein determining, based at least on the index positions stored in the second array, one or more invalid data entries included in the first portion of the first array includes storing the respective index positions of the one or more invalid data entries included in the first portion of the first array in a first N data entries of the second array, wherein N is equal to a number of invalid data entries included in the first portion of the first array.

6. The method of claim 1, wherein the second array consumes less space in memory than the first array.

7. The method of claim 1, wherein a number of data entries included in the first portion of the first array corresponds to a number of valid data entries included in the first array.

8. The method of claim 1, wherein a number of invalid data entries included in the first portion of the first array equals a number of valid data entries included in the second portion of the first array.

9. The method of claim 1, wherein an invalid data element is a data element having a value of zero and a valid data element is a data element having a non-zero value.

10. The method of claim 1, wherein a number of data entries included in the second plurality of data entries is less than a number of data entries included in the first plurality of data entries.

11. The method of claim 1, wherein determining, based at least on the index positions stored in the second array, one or more invalid data entries included in the first portion of the first array is performed at least partially in parallel by multiple processing units.

12. The method of claim 1, wherein determining, based at least on the index positions stored in the second array, one or more valid data entries included in the second portion of the first array is performed at least partially in parallel by multiple processing units.

13. The method of claim 1, wherein replacing the contents of the one or more invalid data entries included in the first portion of the first array with the contents of the one or more valid data entries included in the second portion of the first array is performed at least partially in parallel by multiple processing units.

14. A processor comprising:
one or more circuits to:
receive a first array that includes a first plurality of data entries;
generate a second array that includes a second plurality of data entries;
store, in the second array, respective index positions of valid data entries included in the first array and invalid data entries included in the first array;
determine, based at least on the index positions stored in the second array, one or more invalid data entries included in a first portion of the first array;
determine, based at least on the index positions stored in the second array, one or more valid data entries included in a second portion of the first array; and
replace contents of the one or more invalid data entries included in the first portion of the first array with contents of the one or more valid data entries included in the second portion of the first array.

15. The processor of claim 14, wherein a number of data entries included in the first plurality of data entries is equal to a number of data entries included in the second plurality of data entries.

16. The processor of claim 14, wherein the second array consumes less space in memory than the first array.

17. The processor of claim 14, wherein storing, in the second array, a respective index position of a valid data element included in the first array includes setting a value of a corresponding flag stored in the second array to true and incrementing a valid counter.

18. The processor of claim 14, wherein the processor is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system for generating or presenting at least one of virtual reality content, augmented reality content, or mixed reality content;
a system implemented using a robot;
a system for performing conversational AI operations;
a system for generating synthetic data;
a system incorporating one or more virtual machines (VMs);
a system implemented at least partially in a data center; or a system implemented at least partially using cloud computing resources.

19. A system, comprising:
one or more processing units; and
one or more memory units storing instructions that, when executed by the one or more processing units, cause the one or more processing units to execute operations comprising:
receiving a first array that includes a first plurality of data entries;
generating a second array that includes a second plurality of data entries;
storing, in the second array, respective index positions of valid data entries included in the first array and invalid data entries included in the first array;
determining, based at least on the index positions stored in the second array, one or more invalid data entries included in a first portion of the first array;
determining, based at least on the index positions stored in the second array, one or more valid data entries included in a second portion of the first array; and
replacing contents of the one or more invalid data entries included in the first portion of the first array with contents of the one or more valid data entries included in the second portion of the first array.

20. The system of claim 19, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system for generating or presenting at least one of virtual reality content, augmented reality content, or mixed reality content;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

* * * * *

UNITED STATES PATENT AND TRADEMARK OFFICE
CERTIFICATE OF CORRECTION

| | | |
|---|---|---|
| PATENT NO. | : 12,353,879 B2 | Page 1 of 1 |
| APPLICATION NO. | : 18/468642 | |
| DATED | : July 8, 2025 | |
| INVENTOR(S) | : Pascal Gautron | |

It is certified that error appears in the above-identified patent and that said Letters Patent is hereby corrected as shown below:

In the Specification

In Column 6, Line 62, delete "$C \leq 1$." and insert -- $C \geq 1$. --.

In Column 7, Line 4, delete "$D \leq 1$." and insert -- $D \geq 1$. --.

In Column 8, Line 36, delete "$Q \leq 1$." and insert -- $Q \geq 1$. --.

Signed and Sealed this
Twenty-sixth Day of August, 2025

Coke Morgan Stewart
*Acting Director of the United States Patent and Trademark Office*